United States Patent
Czarny et al.

(10) Patent No.: US 10,242,189 B1
(45) Date of Patent: Mar. 26, 2019

(54) FILE FORMAT VALIDATION

(71) Applicant: OPSWAT, Inc., San Francisco, CA (US)

(72) Inventors: Benjamin Czarny, San Francisco, CA (US); Yiyi Miao, San Mateo, CA (US); Jianpeng Mo, Burlingame, CA (US)

(73) Assignee: OPSWAT, Inc., San Diego, CA (US)

( * ) Notice: Subject to any disclaimer, the term of this patent is extended or adjusted under 35 U.S.C. 154(b) by 0 days.

(21) Appl. No.: 16/148,003

(22) Filed: Oct. 1, 2018

(51) Int. Cl.
G06F 21/56 (2013.01)
G06F 16/11 (2019.01)
G06F 21/62 (2013.01)
H04L 29/06 (2006.01)
G06F 17/30 (2006.01)

(52) U.S. Cl.
CPC .......... *G06F 21/565* (2013.01); *G06F 16/116* (2019.01); *G06F 17/30076* (2013.01); *G06F 21/568* (2013.01); *G06F 21/56* (2013.01); *G06F 21/62* (2013.01); *G06F 2221/034* (2013.01); *H04L 63/12* (2013.01); *H04L 63/123* (2013.01)

(58) Field of Classification Search
CPC ........ G06F 21/56; G06F 16/11; G06F 21/565; G06F 21/568; G06F 2221/034; G06F 17/30076; H04L 29/06; H04L 63/12; H04L 63/123
See application file for complete search history.

(56) References Cited

U.S. PATENT DOCUMENTS

| | | | |
|---|---|---|---|
| 2005/0273708 A1 | 12/2005 | Motyka et al. | |
| 2006/0041840 A1* | 2/2006 | Blair | G06F 17/227 715/249 |
| 2006/0106838 A1 | 5/2006 | Ayediran et al. | |
| 2009/0013408 A1* | 1/2009 | Schipka | G06F 21/563 726/24 |
| 2011/0252473 A1 | 10/2011 | Wiseman | |
| 2014/0189879 A1 | 7/2014 | Ruan et al. | |
| 2017/0032118 A1* | 2/2017 | Carson | G06F 21/52 |
| 2018/0359302 A1* | 12/2018 | Gong | H04L 65/607 |

OTHER PUBLICATIONS

GitHub File Page, 2018, 3 pages, Accessed Online on Sep. 27, 2018 via: https://github.com/file/file.

(Continued)

*Primary Examiner* — Jayesh M Jhaveri
(74) *Attorney, Agent, or Firm* — The Mueller Law Office, P.C.

(57) ABSTRACT

A method for securely validating the file format type including receiving a file having a file format type, a header and a content block. The header has a header block with a description representing attributes of the actual content in the file. The content block has leading bytes representing attributes of the actual content, and actual content. Data is parsed from the description of the header block, the leading bytes and the actual content. Data from the description is compared to the data from the leading bytes, data from the leading bytes is compared to the data from the actual content, and data from the description is compared to the data from the actual content. The file format type is validated and trustable when the data from the description, the data from the leading bytes and the data from the actual content are consistent with one another.

20 Claims, 19 Drawing Sheets

(56) References Cited

OTHER PUBLICATIONS

Kessler, File Signature Table, Aug. 26, 2018, 32 pages, Accessed Online on Sep. 27, 2018 via: https://www.garykessler.net/library/file_sigs.html.
Kessler, Gary Kessler Associates Home Page, 2018, 1 page, Accessed Online on Sep. 27, 2018 via: https://www.garykessler.net/.
Pontello, Marco Pontell's Home Page—TrID—File Identifier, Sep. 23, 2018, 4 pages, Accessed Online on Sep. 27, 2018 via: http://mark0.net/soft-trid-e.html.
Wright, What MIME?, 2018, 1 page, Accessed Online on Sep. 27, 2018 via: http://mime.ritey.com/.

* cited by examiner

FIG. 2

SECTION VIEWER (VC8)

| NAME | V. OFFSET | V. SIZE | R. OFFSET | R. SIZE | FLAGS |
|---|---|---|---|---|---|
| .TEXT | 00001000 | 0000A706 | 00001000 | 0000B000 | 60000020 |
| .RDATA | 0000C000 | 00002CC6 | 0000C000 | 00003000 | 40000040 |
| .DATA | 0000F000 | 00002C88 | 0000F000 | 00002000 | C0000040 |
| .RSRC | 00012000 | 000000B0 | 00011000 | 00001000 | 40000040 |

SECTION VIEWER (VC10)

| NAME | V. OFFSET | V. SIZE | R. OFFSET | R. SIZE | FLAGS |
|---|---|---|---|---|---|
| .TEXT | 00001000 | 00008ADC | 00000400 | 00008C00 | 60008C00 |
| .RDATA | 0000A000 | 00003064 | 00009000 | 00003200 | 00003200 |
| .DATA | 0000E000 | 00002CB0 | 0000C200 | 00001000 | 00001000 |
| .RSRC | 00011000 | 000001B4 | 0000D200 | 00000200 | 00000200 |
| .RELOC | 00012000 | 000013DC | 0000D400 | 00001400 | 00001400 |

SECTION VIEWER (VC9)

| NAME | V. OFFSET | V. SIZE | R. OFFSET | R. SIZE | FLAGS |
|---|---|---|---|---|---|
| .TEXT | 00001000 | 0000ABC0 | 00000400 | 0000AC00 | 60000020 |
| .RDATA | 0000C000 | 00002C78 | 0000B000 | 00002E00 | 40000040 |
| .DATA | 0000F000 | 00002C08 | 0000DE00 | 00001000 | C0000040 |
| .RSRC | 00012000 | 000001B4 | 0000EE00 | 00000200 | 40000040 |
| .RELOC | 00013000 | 000015D6 | 0000F000 | 00001600 | 42000040 |

SECTION VIEWER (VC14)

| NAME | V. OFFSET | V. SIZE | R. OFFSET | R. SIZE | FLAGS |
|---|---|---|---|---|---|
| .TEXT | 00001000 | 0003C728 | 00000400 | 0003C800 | 60000020 |
| .RDATA | 0003E000 | 00009348 | 0003C00D | 00009400 | 40000040 |
| .DATA | 00048000 | 00001CA0 | 00046000 | 0000A00 | C0000040 |
| .GFIDS | 0004A000 | 00000234 | 00046A00 | 00000400 | 40000040 |
| .RSRC | 0004B000 | 000001E0 | 00046E00 | 00000200 | 40000040 |
| .RELOC | 0004C000 | 000022D0 | 00047000 | 00002400 | 42000040 |

400

402
RECEIVING, BY A COMPUTER, A FILE, THE FILE HAVING: A FILE FORMAT TYPE; A HEADER HAVING A FIRST HEADER BLOCK WITH A FIRST DESCRIPTION REPRESENTING ATTRIBUTES OF A FIRST PORTION OF ACTUAL CONTENT IN THE FILE; AND A FIRST CONTENT BLOCK HAVING I) FIRST LEADING BYTES REPRESENTING THE ATTRIBUTES OF THE FIRST PORTION OF THE ACTUAL CONTENT IN THE FILE AND II) THE FIRST PORTION OF THE ACTUAL CONTENT IN THE FILE

404
PARSING, BY THE COMPUTER, DATA FROM THE FIRST DESCRIPTION OF THE FIRST HEADER BLOCK, THE FIRST LEADING BYTES OF THE FIRST CONTENT BLOCK AND THE FIRST PORTION OF THE ACTUAL CONTENT

406
COMPARING, BY THE COMPUTER, I) THE DATA FROM THE FIRST DESCRIPTION TO THE DATA FROM THE FIRST LEADING BYTES, II) THE DATA FROM THE FIRST LEADING BYTES TO THE DATA FROM THE FIRST PORTION OF THE ACTUAL CONTENT, AND III) THE DATA FROM THE FIRST DESCRIPTION TO THE DATA FROM THE FIRST PORTION OF THE ACTUAL CONTENT

408
VALIDATING, BY THE COMPUTER, THE FILE FORMAT TYPE WHEN THE DATA FROM THE FIRST DESCRIPTION, THE DATA FROM THE FIRST LEADING BYTES AND THE DATA FROM THE FIRST PORTION OF THE ACTUAL CONTENT ARE CONSISTENT WITH ONE ANOTHER

FILE FORMAT VALIDATION

BACKGROUND

File format identification and validation may be used for data security. For example, when a file is transmitted electronically, the receiving end identifies and detects the file type, which may aid in determining if the file is safe from a variety of forms of harmful or intrusive software, including computer viruses, worms, Trojan horses, ransomware, spyware, adware, scareware, and other malicious programs which can take the form of executable code, scripts, active content, and other software. A variety of methods to verify the file format using a database are known in the art.

One method to determine the file format is by verifying in the database a correspondence between the file name suffix—".doc"—and the file type—Microsoft word file. This may be effective for popular file format types but with the amount of possible file name suffixes, the method may not be sophisticated to detect obscure software program files. Additionally, the file may not be saved with the file name suffix. Another method is to leverage the standard Multipurpose Internet Mail Extension (MIME) to verify the given file format. For example, a set of MIME instructions may be inserted into the beginning of the data transmission which provides instructions to the electronic device about how the file should be opened or viewed. There are typically public sites of databases listing the file type detection using the basic MIME standard.

Signature-based file type verification mechanisms may be used to determine the file format. This is a pattern match between a certain length or number of bytes in a part of the file and a signature database. A file signature is data used to identify or verify the contents of a file. In particular, it may refer to a "magic number" which is generally a short sequence of bytes placed at the beginning of the file used to identify the format of the file. In use, the magic number is found in a database to identify and verify the file format. For example, the magic number in the header of the file may be analyzed, and if the magic number corresponds to a pre-stored known file type, then the file format is the file format that corresponds to the magic number.

Many databases exist for this purpose of file format verification, which may be public. For example, a crowd source machine learning system may be used to determine the file format by a binary signature. This system leverages community users to provide training samples. Unfortunately, this may be easily manipulated by a random user creating a seasoned sample set and mis-training the system. In another example, an open source project may use an abstract layer on top of the signature-based mechanism for byte pattern matching logic by consulting a database.

Because these conventional systems and methods rely on databases, the databases need to be up-to-date with a vast amount of data to comprehend file formats from a variety of software systems and applications. The signature such as the magic number may be purposely modified and therefore the security and trustability of the file cannot be ensured.

SUMMARY

A method is disclosed including a computer receiving a file. The file has a file format type, a header and a first content block. The header has a first header block with a first description representing attributes of a first portion of actual content in the file. The first content block has first leading bytes representing the attributes of the first portion of the actual content in the file, and the first portion of the actual content in the file. Data is parsed by the computer from the first description of the first header block, the first leading bytes of the first content block and the first portion of the actual content. The computer compares data from the first description to the data from the first leading bytes. The computer compares data from the first leading bytes to the data from the first portion of the actual content. The computer compares data from the first description to the data from the first portion of the actual content. The computer validates the file format type when the data from the first description, the data from the first leading bytes and the data from the first portion of the actual content are consistent with one another.

In some embodiments, when the data from the description, the data from the leading bytes and the data from the actual content are inconsistent with one another, the computer sanitizes the file to remove malicious content. After the malicious content is removed, the computer regenerates the file.

A computerized system is disclosed including a memory storing executable instructions. A processor is coupled to the memory and performs a method for file format validation by executing the instructions stored in the memory. The method includes the processor receiving a file. The file has a file format type, a header and a first content block. The header has a first header block with a first description representing attributes of a first portion of actual content in the file. The first content block has first leading bytes representing the attributes of the first portion of the actual content in the file, and the first portion of the actual content in the file. Data is parsed by the processor from the first description of the first header block, the first leading bytes of the first content block and the first portion of the actual content. The processor compares data from the first description to the data from the first leading bytes. The processor compares data from the first leading bytes to the data from the first portion of the actual content. The processor compares data from the first description to the data from the first portion of the actual content. The processor validates the file format type when the data from the first description, the data from the first leading bytes and the data from the first portion of the actual content are consistent with one another.

DESCRIPTION OF DRAWINGS

FIG. 2 is an example of files with executable files compiled by different compilers, in accordance with some embodiments.

FIG. 4 is a simplified flowchart for a method for file format validation, in accordance with some embodiments.

FIG. 5A is an example of a header block description for an image in a file, in accordance with some embodiments.

FIG. 5B is an example of a content block with leading bytes in the file, in accordance with some embodiments.

FIG. 5C is an example of actual encoded data content in the content block in the file, in accordance with some embodiments.

FIG. 10A is an example of a content block for a URI in a file, in accordance with some embodiments.

DETAILED DESCRIPTION

There are many different file format types in existence. When files are received by a communication network, the communication network often validates the file format type before allowing the file to enter the communication network. This may be a means of data security. The methods and systems disclosed herein securely validate a file format type without relying on the file name suffix or signature-based, static databases. The methods and systems analyze the file structure and content dynamically by breaking down the file into blocks and parsing data from the blocks in the file header, leading bytes in the blocks and the actual content. The parsed data from the file header, leading bytes and the actual content are analyzed and compared. If the analyzed parsed data is consistent with one another, the file format type is validated.

The methods and systems determine whether the file format type identified in the header is trustable by verifying that the file format type of the file is truly that given in the file header. Discrepancies found may indicate potential malicious content in a particular block. Because the block is known, the location of the potential malicious content can be quickly pin-pointed. In some embodiments, file sanitization is performed to remove the malicious content and the file is regenerated. The methods and systems ensure the integrity and safety of the file before entering a network by validating the file format type, which minimizes the security risk and provides a foundation for other post security checks. For example, based on the file format type and the validation, a basic security check or an advanced security check may be implemented depending on the particular file format type.

Figure 1A:
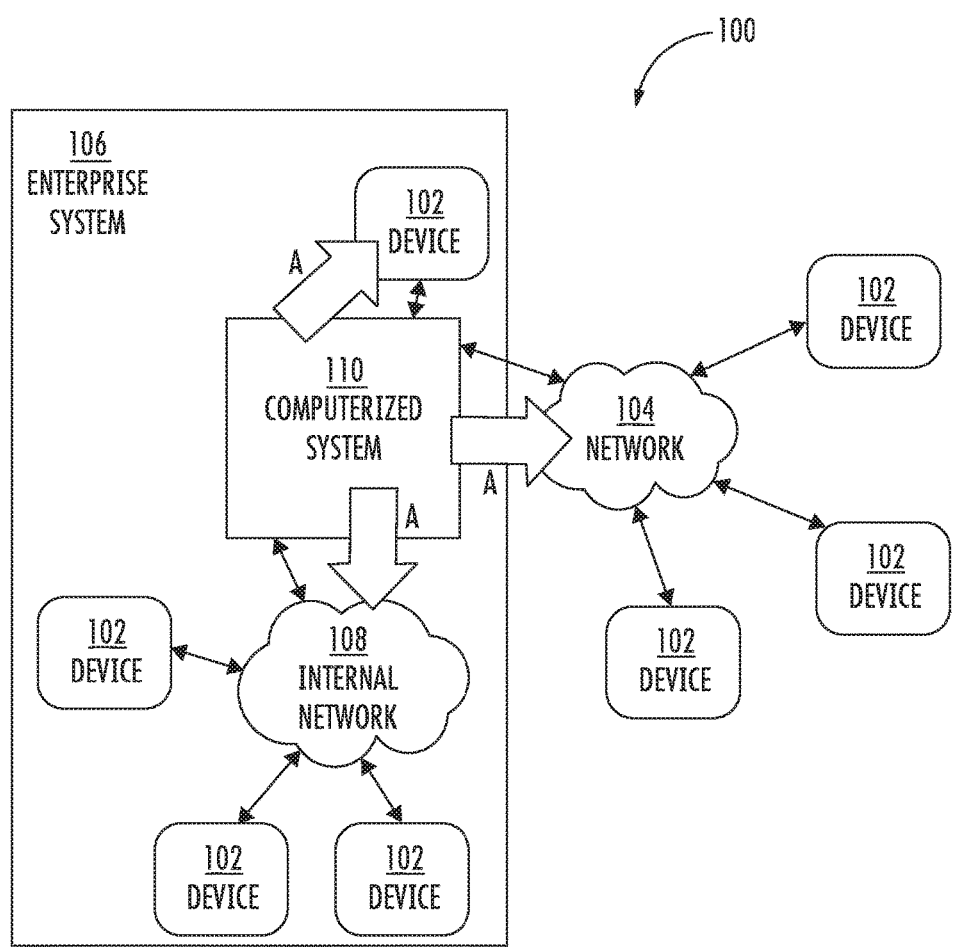
FIG. 1A is a simplified schematic of an example communication system, in accordance with some embodiments.

FIG. 1A is a simplified schematic of an example communication system 100, in accordance with some embodiments, with which users communicate with each other using a variety of communication devices 102, such as personal computers, laptop computers, tablets, mobile phones, landline phones, smartwatches, smart cars, or the like, operated by a user. The devices 102 generally transmit and receive communications such as files, data and emails, through a variety of paths, communication access systems or networks 104. The networks 104 may be the Internet, a variety of carriers for telephone services, third-party communication service systems, third-party application cloud systems, third-party customer cloud systems, cloud-based broker service systems (e.g., to facilitate integration of different communication services), on-premises enterprise systems, or other potential systems. In some embodiments, the communication system 100 includes an on-premises enterprise system 106 which may be a computer, a group of computers, a server, a server farm or a cloud computing system.

Figure 1B:
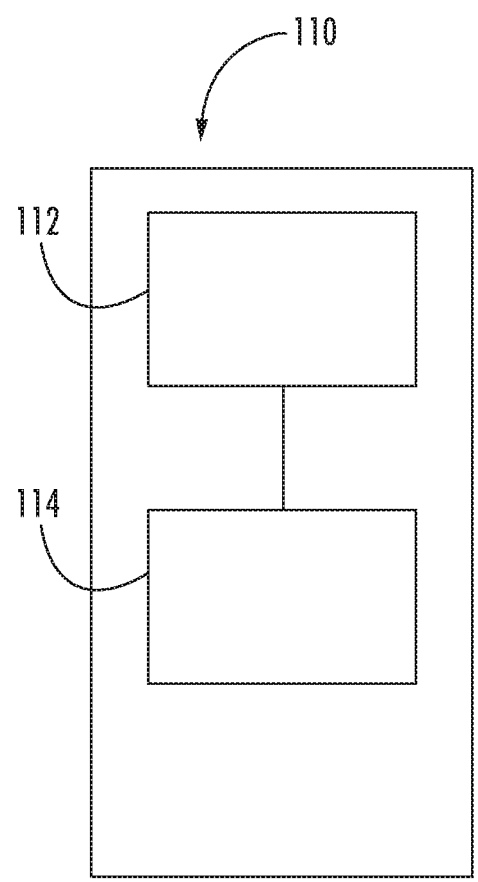
FIG. 1B is a simplified schematic of an example computerized system, in accordance with some embodiments.

The enterprise system 106 may include an internal network 108 through which internal communication devices 102 communicate. A computerized system 110 is included which receives all communication, such as data or files transmitted to or within the enterprise system 106. In some embodiments, the computerized system 110 receives the files through the network 104, the internal networks 108 or directly from some of the devices 102. The files may be common document types, image files, emails, etc. In this way, the incoming files can be evaluated using security measures, thus protecting the enterprise system 106 and devices 102 from known or unknown threats. The incoming files can be verified by the computerized system 110 and then returned to the network 104, the internal networks 108 or directly to the devices 102 as indicated by arrows A. In some embodiments, the computerized system 110 (or a part thereof) is part of the on-premises enterprise system 106 or a regional communication system and may be associated with one or a plurality of such enterprises 106, entities or business organizations. FIG. 1B is a simplified schematic of an example computerized system 110, in accordance with some embodiments. The computerized system 110 includes a memory 112 storing executable instructions and a processor 114 coupled to the memory.

In accordance with the description herein, the various illustrated components of the communication system 100 generally represent appropriate hardware and software components for providing the described resources and performing the described functions. The hardware generally includes any appropriate number and combination of computing devices, network communication devices, and peripheral components connected together, including various processors, computer memory (including transitory and non-transitory media), input/output devices, user interface devices, communication adapters, communication channels, etc. The software generally includes any appropriate number and combination of conventional and specially-developed software with computer-readable instructions stored by the computer memory in non-transitory computer-readable or machine-readable media and executed by the various processors to perform the functions described herein.

An incoming file 200 (see FIG. 3 below) may have been compiled by a variety of compilers. Compilers typically translate source code from a high-level programming language to a lower level language such as assembly language, object code, or machine code, to create an executable program. For the same source code, each compiler may produce different executable files from one another. FIG. 2 is an example of the files with executable files compiled by different compilers, in accordance with some embodiments. The compilers used are labeled as VC8, VC9, VC10 and VC14. The results of the executable files for each compiler are shown. For example, VC9 has executable files such as ".text" 210a-9, ".rdata" 210b-9, ".data" 210c-9, ".rsrc" 210d-9 and ".reloc" 210e-9.

Figure 3:
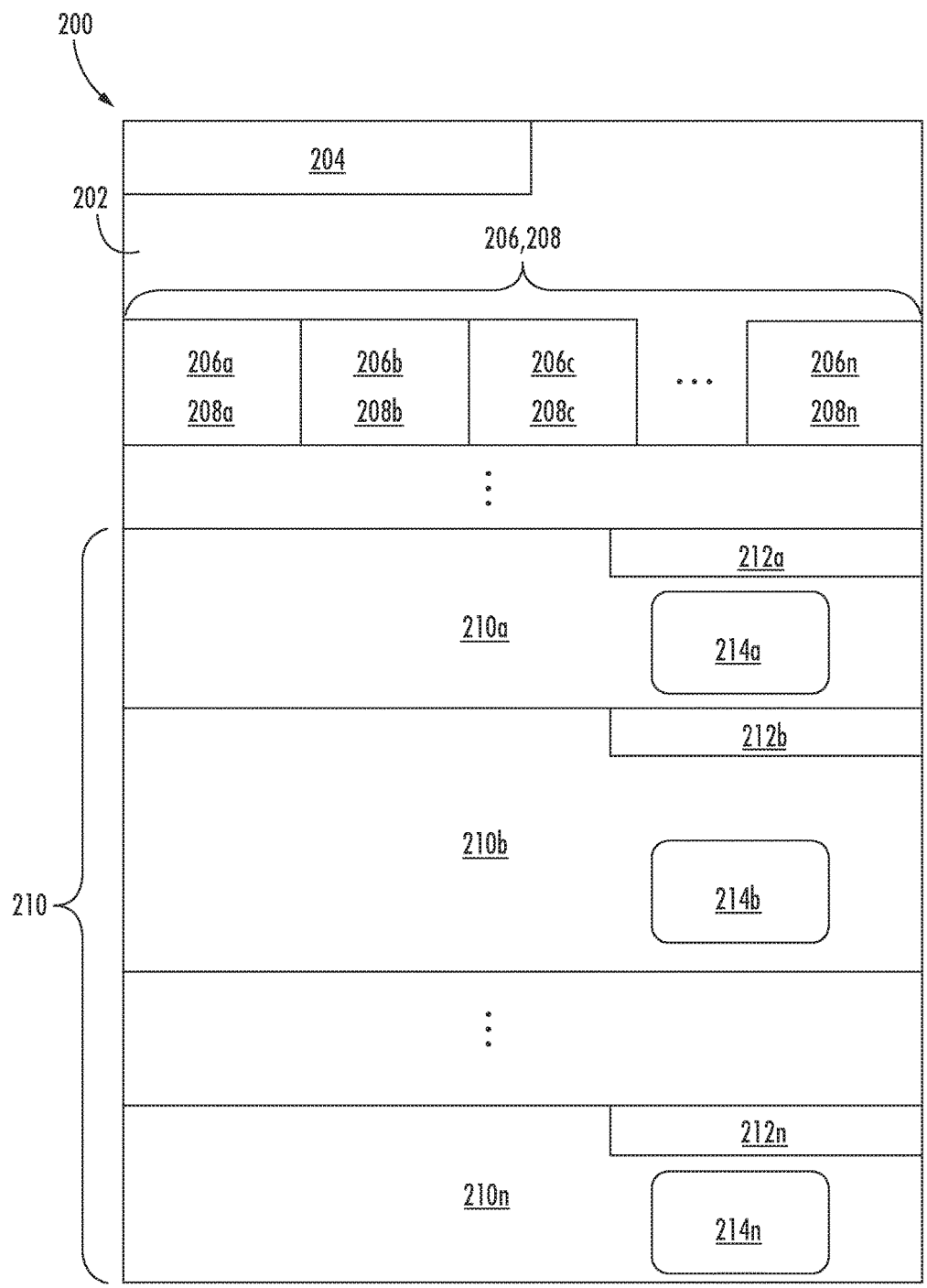
FIG. 3 is a simplified schematic of the organization of an example file, in accordance with some embodiments.

FIG. 3 is a simplified schematic of the organization of the file 200, in accordance with some embodiments. The file 200 has a header 202, which includes a file format type 204 identifying the type of file by, in some embodiments, a signature. The signature may be a binary signature, a magic number, a file name suffix or the like. Examples of file format types include word processing documents, image files, portable document files, or any format type.

The header 202 may be broken down into blocks and includes at least one header block 206. For a plurality of header blocks 206, the header blocks may be referred to as 206a, 206b, 206c . . . 206n representing any number of header blocks 206. Each header block 206 has a header block description 208. For a plurality of header block descriptions 208, the header block descriptions may be referred to as 208a, 208b, 208c . . . 208n representing any number of header block descriptions 208. The header block description 208 is data that represents attributes of actual content in the file. The header block description 208 of the header block 206 may include header block bytes describe the attributes of the actual content 214 in the file 200.

The header block description 208 within the header 202 describes various aspects of the file 200 that represents attributes of actual content in the file. The header block description 208 or the plurality of the header block descriptions 208a-n describe the actual content in the file 200. For example, the header block description 208 may describe the attribute in the file 200 which may include a component data type such as text, an image, table, an embedded object, a hyperlink, an assembly code, a macro, scripts or the like, component dimension data such as length, height, width of a graphic insert, or the length of text. It may also describe extension and reference table symbols or additional file format specific attributes such as an author of the file 200, audio track, or the like.

The file 200 includes at least one content block 210 which may be an executable file as shown in FIG. 2. For a plurality of content blocks 210, the content blocks may be referred to as 210a, 210b, 210c . . . 210n representing any number of content blocks 210. The content block 210 has content data that represents attributes of the actual content in the file which are led by leading bytes 212. The content block 210 or the plurality of content blocks 210a-n describe the actual content in the file 200. Leading bytes 212 (or 212a, 212b, 212c . . . 212n) are certain bytes which lead the content data in the content block 210 and describe what is in the content block 210. The leading bytes 212 are at the beginning of the content block 210. Other bytes, such as content block bytes follow the leading bytes 212 in the content block 210. These further define the attribute of the actual content 214 in the file 200 represented by the leading bytes 212. The content block 210 also includes the actual content 214 (or 214a, 214b, 214c . . . 214n) in the file 200.

The leading bytes 212 within the content block 210 of the file 200 detail various aspects of the file 200 that represents attributes of actual content in the file 200. For example, the leading bytes 212 may detail the attribute or content in the file 200 which may include a content data type such as an image, text, table, or content dimension data. It may detail a content reference data index which may indicate an embedded object, macro, or an external hyperlink in the file 200. The leading bytes 212 may also detail a function, assembly code or scripts pointer used within the content block 210, or additional file format specific attributes, such as an author of the file 200, audio track, or the like. The leading bytes 212 may detail an encoding mechanism or a decoding mechanism.

The actual content 214 of the file 200 may include anything in the file. This varies greatly based on the particular file and may include at least one of an image, text, table, embedded object, hyperlink, assembly code, a macro, scripts, dimension, file extension, reference table symbol, function, author of the file, audio track, etc.

A method for file format validation is used by the computerized system 110 of the enterprise system 106 to validate the file type of incoming files before the files enter the enterprise system 106 or the other devices 102. The method confirms whether the file format of the incoming file is truly as described in the file header, and may be used as a security measure to detect potential malicious content inserted into the file when the file format is not validated. In this way, the file may be deemed trustable when the file format is validated. FIG. 4 is a simplified flowchart for a method 400 for file format validation, in accordance with some embodiments. The illustrated and described steps, order of steps, and combination of steps are provided for explanatory purposes only. Other embodiments may use other specific steps, order of steps, and combination of steps to achieve similar results.

The method for file format validation 400 starts at step 402 by a computer receiving the file 200. The file 200 has a file format type 204, a header 202 and a content block 210. The header 202 has at least one header block 206 (such as a first header block) with the header block description 208 (such as a first header description), which represents attributes of the actual content 214 in the file 200 (such as a first portion of actual content in the file). The content block 210 (such as a first content block) has leading bytes 212 (such as first leading bytes) representing attributes of the actual content 214 in the file 200 (such as a first portion of actual content in the file), and the actual content 214 in the file 200 (such as a first portion of the actual content in the file). At step 404, data is parsed by the computer from the header block description 208 of the header block 206, the leading bytes 212 of the content block 210 and the actual content 214.

The parsed data may include whether the header block description 208 or the content block 210 is expected, the data type in the header block description 208 or the content block 210, the data component dimension, whether the header block description 208 or the content block 210 may contain embedded objects, hyperlinks, macros, assembly code or function references, or whether the expected encoding mechanism or decoding mechanism is properly used in the data content. For example, if the file format type 204 is an image file then it would be expected that the header block description 208 and the content block 210 contain a representation of an image with dimensions such as length and height of the image. Because the file 200 is an image, the file 200 would not contain other content not associated or consistent with an image file such as embedded objects, hyperlinks, macros, assembly code or function references, or an encoding mechanism or decoding mechanism.

At step 406, the parsed data from the header block description 208 is compared to the parsed data from the leading bytes 212. The computer compares the parsed data from the leading bytes 212 to the parsed data from the actual content 214. The computer compares the parsed data from the header block description 208 to the parsed data from the actual content 214. At step 408, the computer validates the file format type 204 when the parsed data from the header block description 208, the parsed data from the leading bytes 212 and the parsed data from the actual content 214 are consistent with one another. In some embodiments, when the file format type is validated, the file is trustable.

In some embodiments, the header of the file 200 further has a second header block with a second description representing attributes of a second portion of the actual content in the file 200, and the file 200 further has a second content block having second leading bytes representing attributes of a second portion of the actual content in the file 200 and, the second portion of actual content in the file 200. In this way, the method is performed for all of the blocks in the file 200 and any embedded objects within the blocks. Then, there is a high level of confidence that the file 200 actually has the content as described in the file header 202 without additional items such as harmful or intrusive software, including computer viruses, worms, Trojan horses, ransomware, spyware, adware, scareware, and other malicious programs which can take the form of executable code, scripts, active content, and other software.

When the data from the header block description 208, the data from the leading bytes 212 and the data from the actual content 214 are inconsistent with one another, the file 200 is rejected. This is a security measure to protect the communication system 100 from a suspicious file. In some embodiments, the method 400 identifies the location within the file 200 of the header block 206, the content block 210 or the actual content 214 that contains the inconsistent data. Optionally, the header block 206, the content block 210 or the actual content 214 of the inconsistent data may be analyzed for a potential threat such as viruses, worms, Trojan horses, ransomware, spyware, adware, scareware, and other malicious programs.

In a simplified, non-limiting example, the computerized system 110 receives the file 200 which is a PDF file format type with many attributes such as at least one image. The method for file format validation 400 is performed. The header 202 is broken down into blocks. Data is parsed from the header block description 208, and the content block 210 with the leading bytes 212 and the actual content 214 for the image attribute.

Figure 5A:
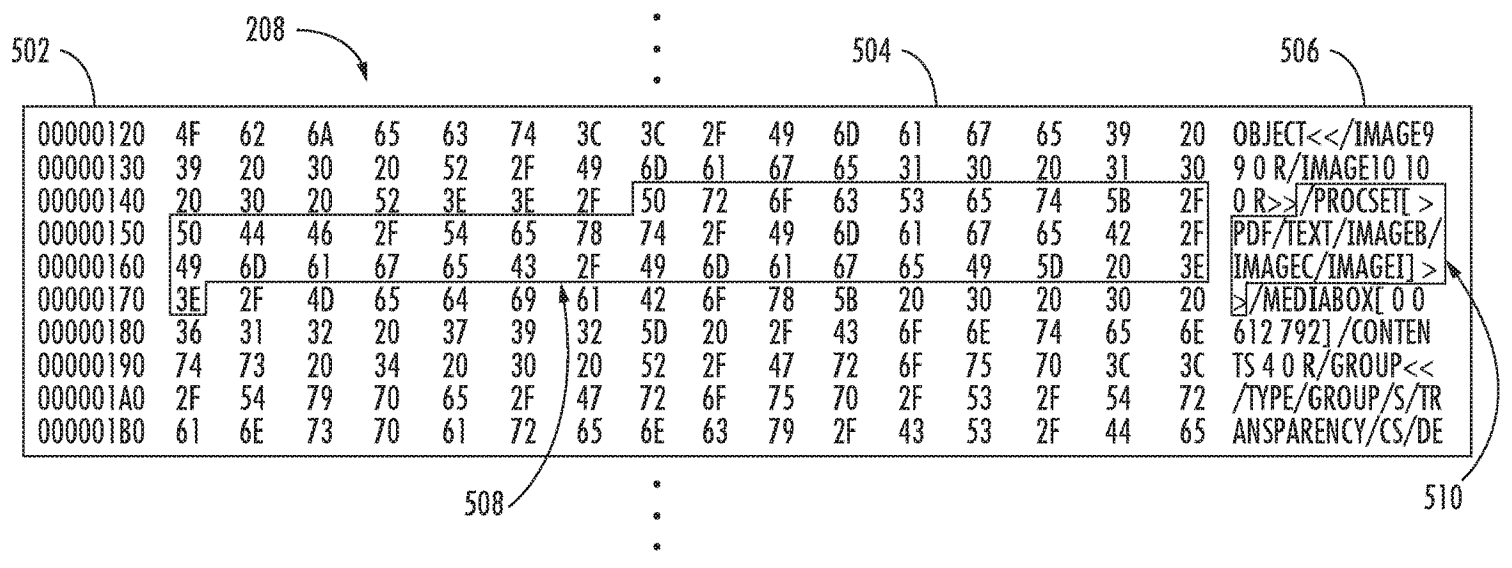

FIG. 5A is an example of the header block description 208 for an image in the file 200, in accordance with some embodiments. The actual content 214 in the file 200 is an image and the file is a PDF. Column 502 is the offset which is a position locater for the image in the code. Column 504 is the hexadecimal data describing components (or attributes) in the file 200. Hexadecimal data is a positional numerical system that uses distinct symbols to represent values and letters. Column 506 shows the hexadecimal data interpreted, which may be a number or an ASCI character. Highlight 508 is a particular component of an image in the hexadecimal data. This is directly interpreted in highlight 510 in column 506. For example, in column 504, in highlight 508, "49" is interpreted in column 506 in highlight 510 as "I". Correlating highlight 508 to highlight 510, generates " . . . /ImageB/ImageC/ImageI" which describes an image.

Figure 5B:
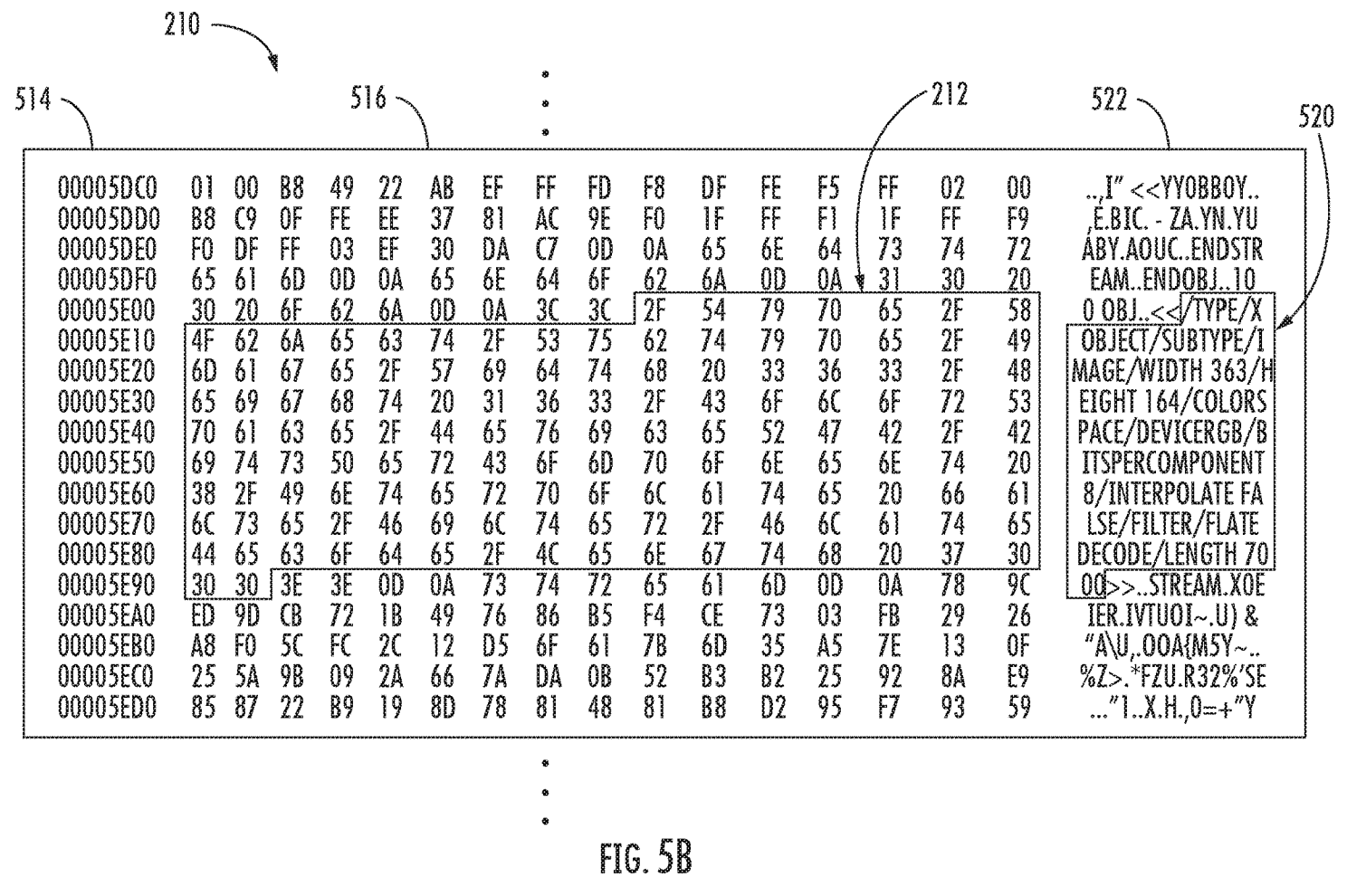

For the same image example as in FIG. 5A, FIG. 5B is an example of the content block 210 with leading bytes 212 in the file 200, in accordance with some embodiments. Column 514 is the offset which is a position locater for the content block 210 in the code. Column 516 is hexadecimal data detailing the bytes for the content block 210 which starts with leading bytes 212. The leading bytes 212 are interpreted in highlight 520 in column 522. For example, in column 516, "49" is interpreted in column 522 in highlight 520 as "I". Correlating the leading bytes 212 in column 516 to column 522, generates " . . . /Image/Width 363/Height 163/" which describes the same image as in FIG. 5A. The image has a width of 363 and a height of 163 in the file 200.

Figure 5C:
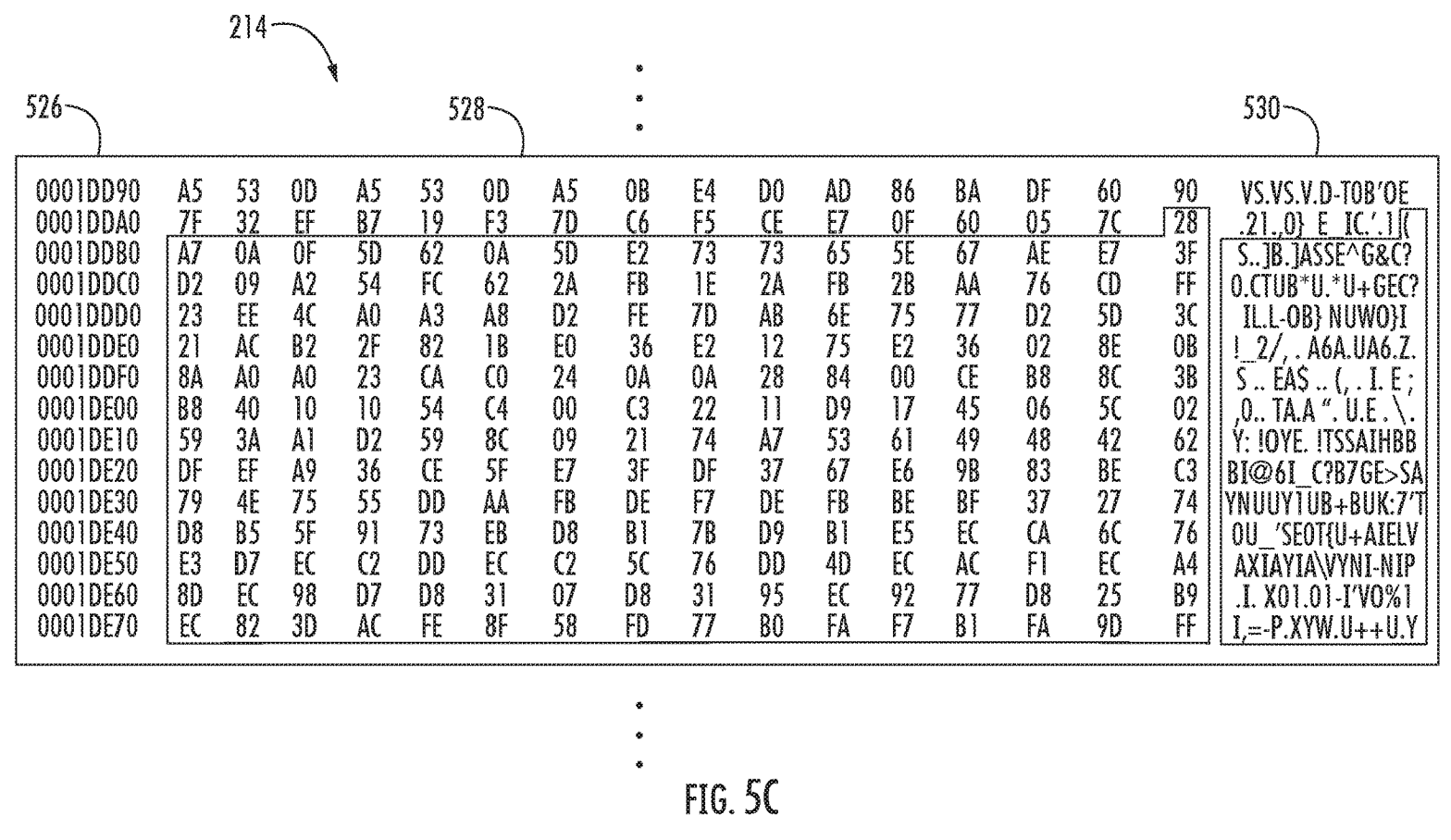

The content block 210 also contains the actual content. For the same image example as in FIG. 5A, FIG. 5C is an example of a portion of the actual encoded data content 214 in the content block 210 in the file 200, in accordance with some embodiments. Column 526 is the offset which is a position locater for the image in the code. Column 528 is the hexadecimal data describing components or attributes in the file 200. Column 530 shows the hexadecimal data interpreted which may be machine read.

FIGS. 5A-5C illustrate the different data within the overall file that relate to the image. Together, this data is used to verify that an image is present in the file 200. The data from the header block description 208, the data from the content block 210 and the data from the actual content 214 are compared to one another for consistency. In this scenario, each has image data for the same image, so they are consistent with one another. The file format type is thus validated.

Figure 6:
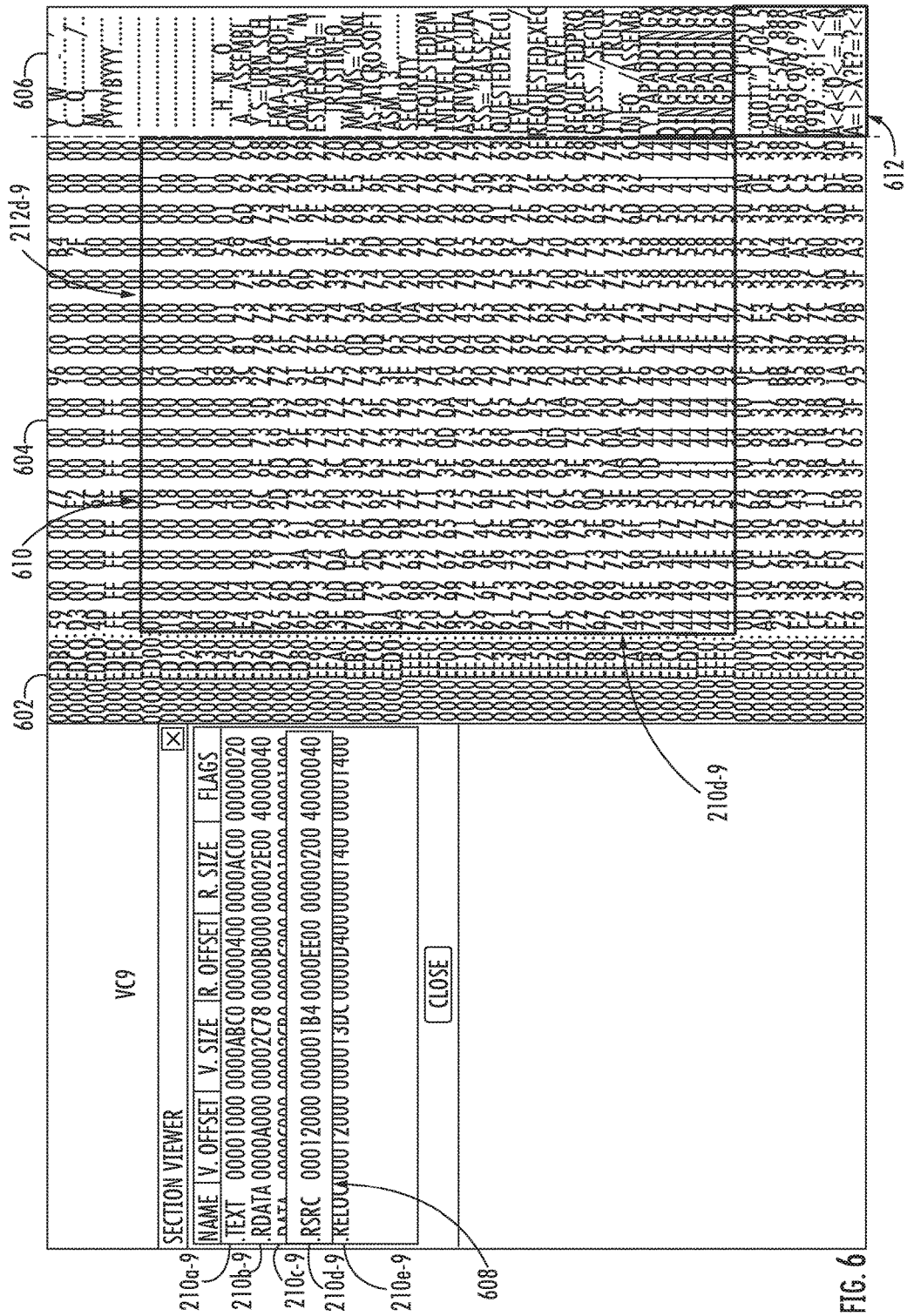
FIG. 6 is an example of a content block with leading bytes in a file, in accordance with some embodiments.
Figure 7:
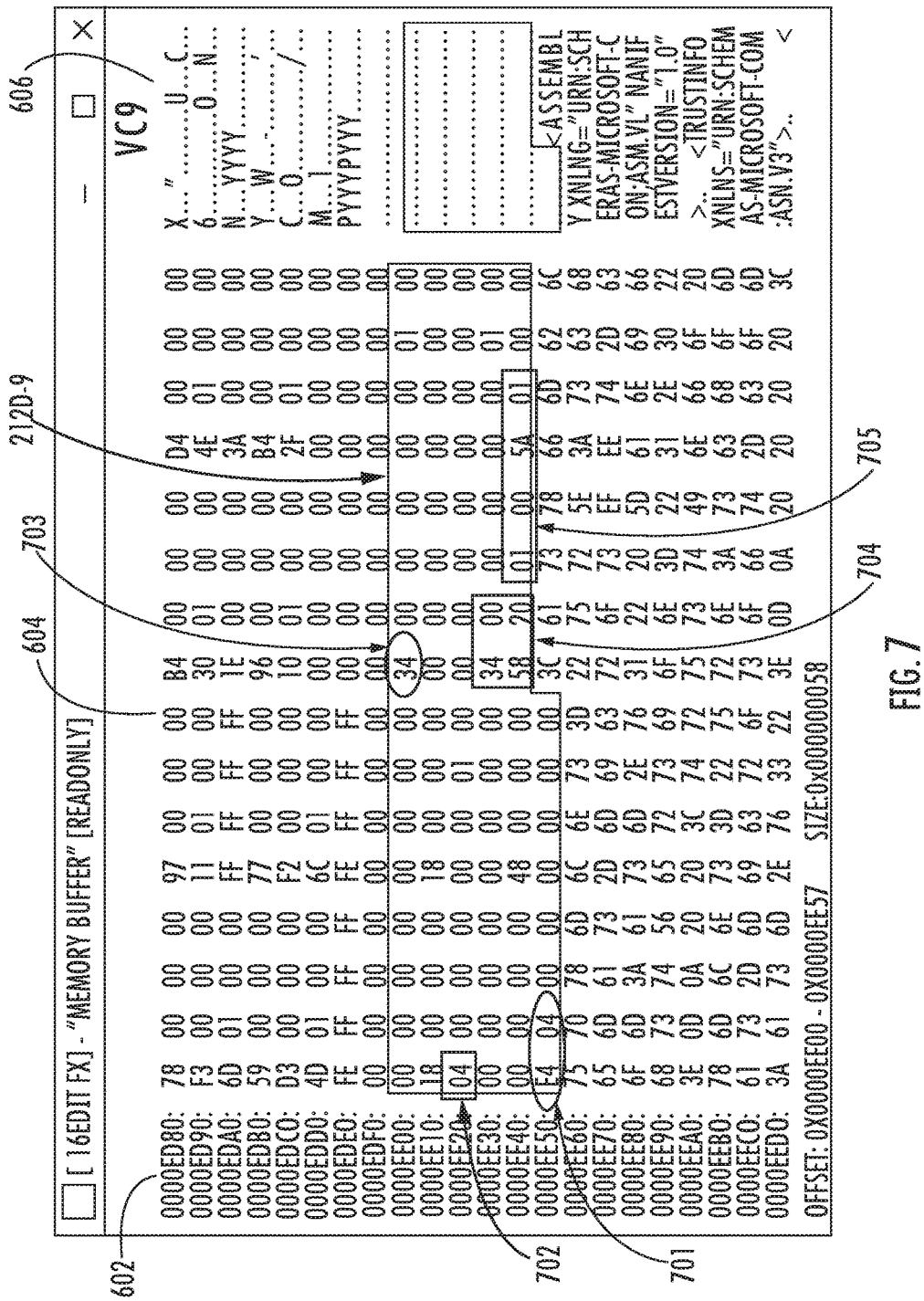
FIG. 7 is a partial view of FIG. 6 illustrating a close-up view of the leading bytes, in accordance with some embodiments.

FIG. 6 is an example of a content block 210d-9 with leading bytes 212d-9 in the file 200, in accordance with some embodiments. The executable files from the compiler VC9, as shown in FIG. 2, are depicted. In this example, the .rsrc content block 210d-9 is detailed. Column 602 is the offset which is a position locater for the .rsrc content block 210d-9 in the code. In this case, the .rsrc content block 210d-9 has an offset of "0000EE00" listed in highlight 608 and found in column 602. Therefore, the .rsrc content block 210d-9 begins at 0000EE00 listed in column 602. Column 604 is hexadecimal data detailing the bytes for the .rsrc content block 210d-9 which starts with leading bytes 212d-9 indicated in highlight 610. FIG. 7 is a partial view of FIG. 6 illustrating a close-up view of the leading bytes 212d-9, in accordance with some embodiments.

Data may be parsed from the leading bytes 212d-9 and represent a particular attribute in the file 200. For example, the parsed data may represent the data type, the data component dimension, an embedded object, hyperlink or macro. Labels 701-705 are examples of parsed data bytes in the leading bytes 212d-9 that represent a particular attribute in the file 200. For example, label 701 is a hyperlink. Details of the parsed data (labels 701-705) in the leading bytes 212d-9 can be found in the bytes following the leading bytes 212d-9 of the content block 210d-9 and may include component dimension data such as length, height, width, or length of text.

In some embodiments, the actual content may be found and interpreted from column 606 in highlight 612 of FIG. 6. This may correspond to, for example, content in the file 200 such as an embedded object, a macro, an image or another component in the file 200. Following the leading byes 212d-9 are bytes in the content block 210d-9 that further define the attribute.

Figure 8:
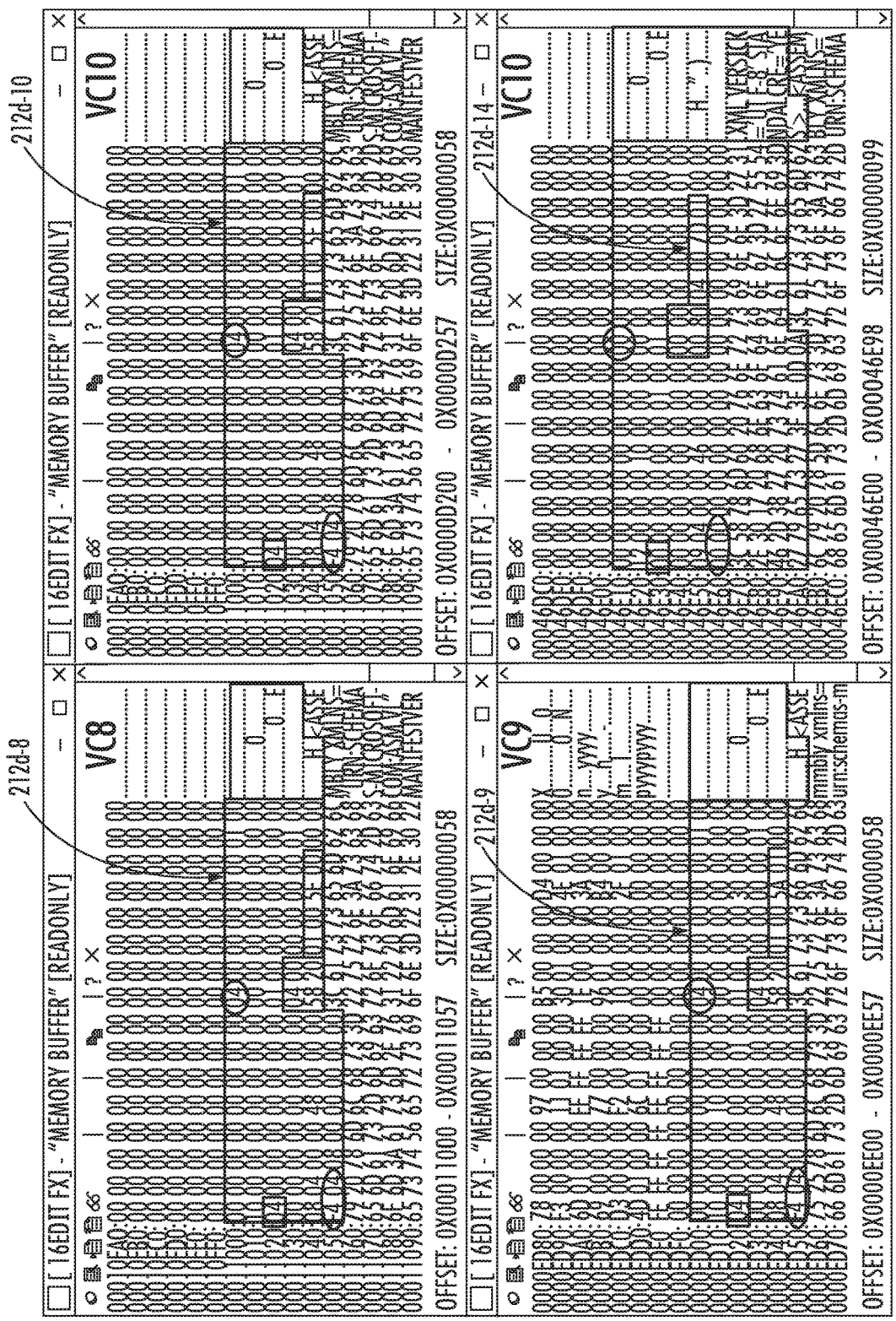
FIG. 8 shows example leading bytes for the compiled files in FIG. 2, in accordance with some embodiments.

FIG. 8 shows the leading bytes 212 for the compiled files in FIG. 2 of VC8, VC9, VC10 and VC14, in accordance with some embodiments. Each compiler may produce different executable files from one another but for this given source code, each compiler produced a .rsrc executable file which is the .rsrc content block 210d. For clarity, the .rsrc content blocks 210d for a given compiler may be labelled as 210d-8, 210d-9, 210d-10 and 210d-14 respectively. Each of the .rsrc content block 210d begin with the leading bytes 212 and are labelled as 212d-8, 212d-9, 212d-10 and 212d-14 respectively.

For file format type validation, conventional methods may check the leading bytes as a signature to attempt to match this signature to an existing database to confirm the .rsrc content block is actually an .rsrc content block. For example, for VC8, VC9 and VC10, up to the first 88 bytes (leading bytes) may be used as the signature, while for VC10, up to the first 152 bytes may be used as the signature. The signature of the leading bytes based on the particular compiler is located and matched to data in an existing database. If there is a match, then the file type is validated. In this way, the static databases are relied upon and need to be kept up-to-date for known and unknown compilers, different compiler types, various settings, or a variety of versions or configurations. When the signature is found in the database and the file type is validated, there's no check as to what is actually in the file. For example, the leading bytes or signature may be hacked and manipulated to look like the signature of an .rsrc content block and therefore found in the existing database, but not actually contain .rsrc data. By parsing data points from the description of the header block, the leading bytes of the content block and the actual content, the method and system dynamically analyze and determine what the bytes actually mean and then confirms that attribute is actually present in the file. In contrast, the conventional method merely matches a signature to a database.

Figure 9:
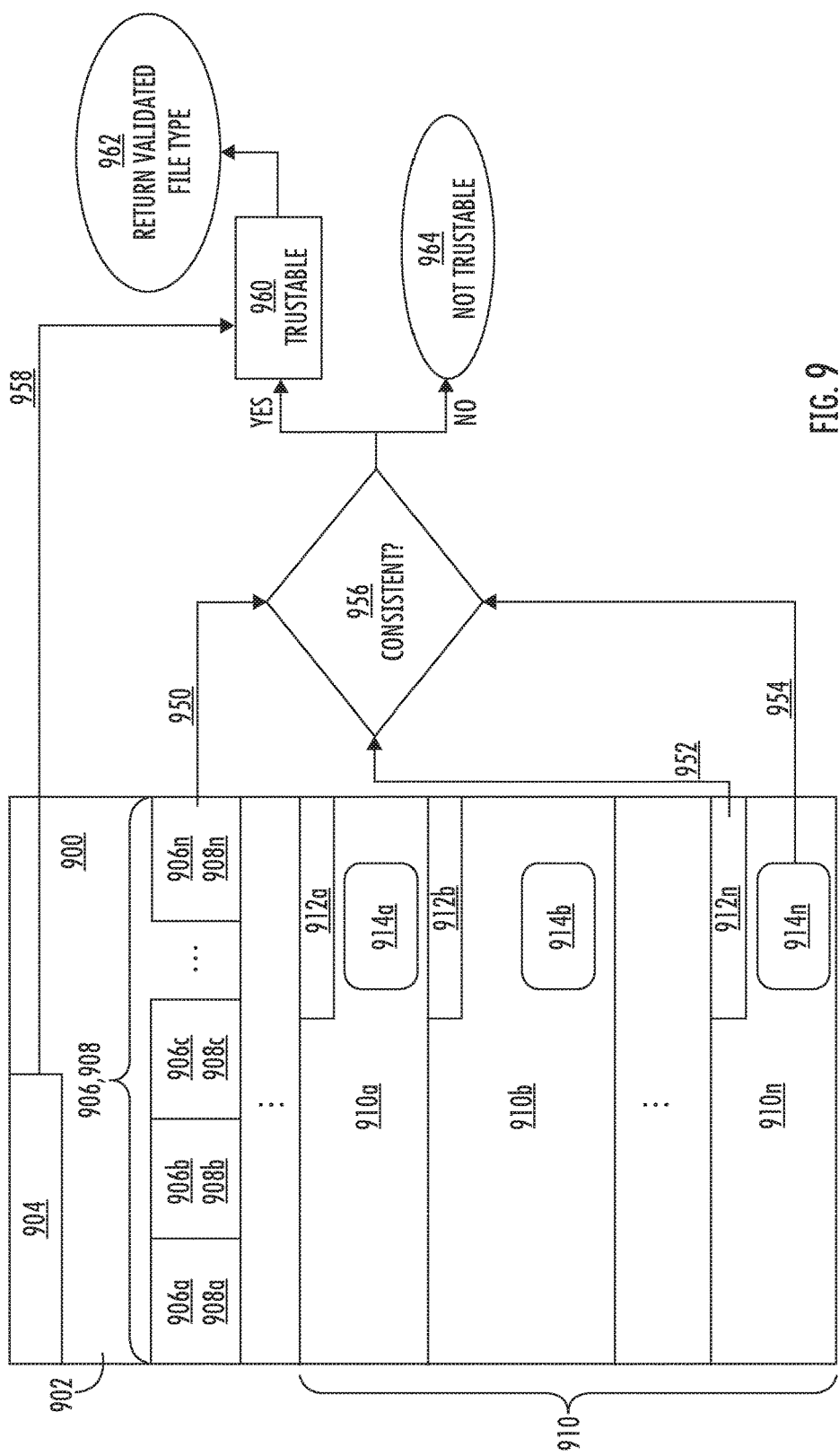
FIG. 9 is a simplified flowchart of an example method for file format validation, in accordance with some embodiments.

FIG. 9 is a simplified flowchart of the method 400 for file format validation, in accordance with some embodiments. In this example, this may be performed by the computerized system 110. A file 900 is received, which is a Microsoft word file having the file suffix of .doc. Among many attributes, the file 900 has a hyperlink of a Uniform Resource Identifier (URI) in the body of the text. The URI is a reference to a web resource that specifies its location on a computer network and a mechanism for retrieving it. This references a web page such as https://www.opswat.com/. The header 902 in the file 900 has a file format type 904 of .doc. The header is broken down into blocks and has a plurality of header blocks 906 (906a . . . 906n) and a plurality of header block descriptions 908 (908a . . . 908n). The file 900 has a plurality of content blocks 910 (901a . . . 910n) and each content block 910 has leading bytes 912 (912a . . . 912n) and actual content 914 (914a . . . 914n).

At step 950, data is parsed from the header block description 908n of header block 906n. In some embodiments, the parsed data is the URI hyperlink. In this way, the header block description 908n indicates a URI hyperlink, and instead of merely finding a signature in a database to confirm the file format type as known in the art, the method analyzes the bytes in the header block description 908n and verifies that the URI actually appears in the code.

Figure 10A:
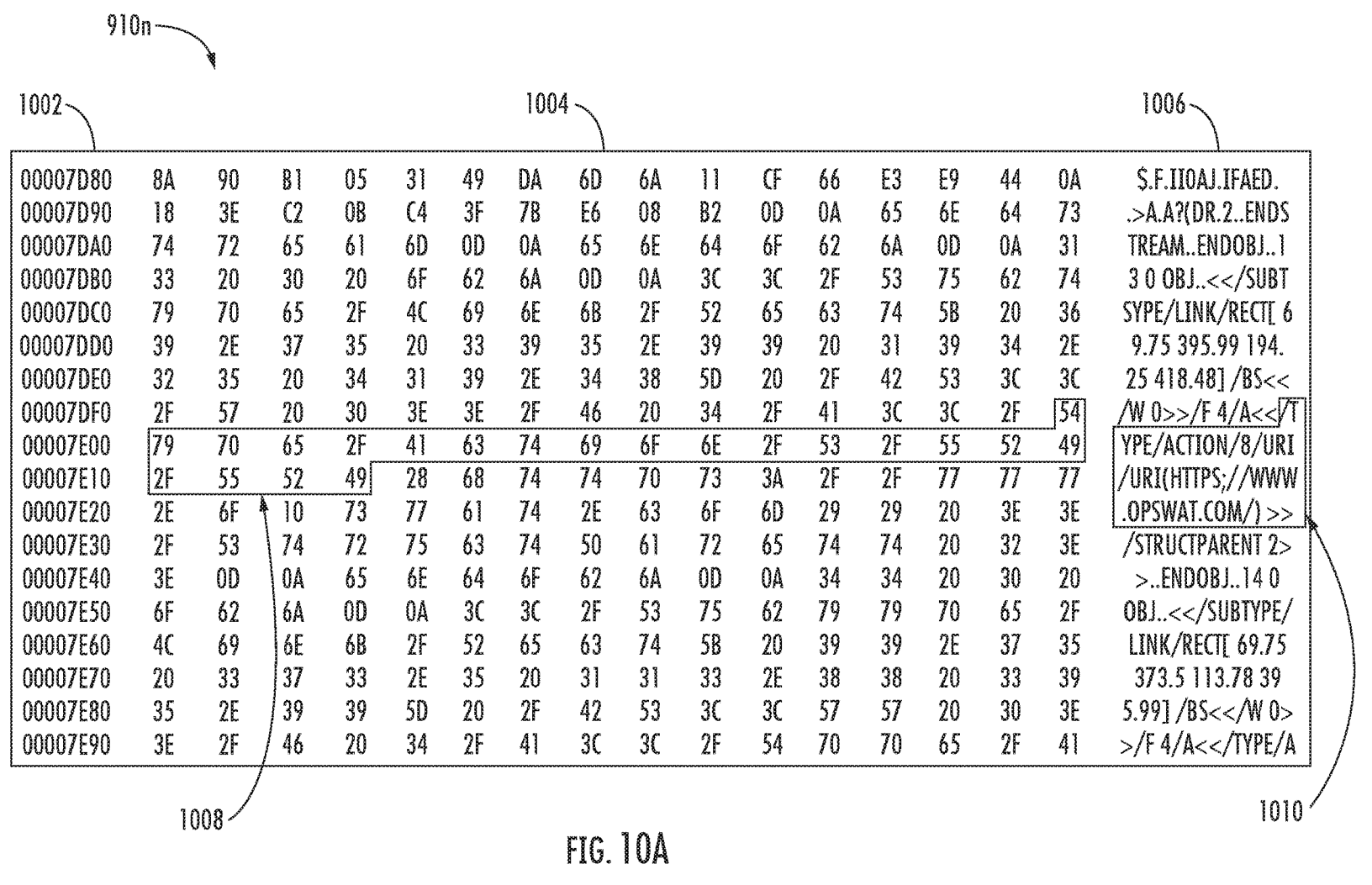

At step 952, in some embodiments, the data is parsed from the content block 910n having the URI hyperlink. FIG. 10A is an example of the content block 910n for a URI in the file 900, in accordance with some embodiments. The leading bytes 912n are read and a URI is identified in the leading bytes 912n. The bytes following the leading bytes 912n are analyzed and the information for the URI is found. In this way, the leading bytes 912n of the content block 910n indicated a URI hyperlink was in the content block 910n, and instead of merely finding a signature in a database to confirm the file format type as known in the art, the method analyzes the bytes and verifies that the URI actually appears in the code in the content block 910n. For example, column 1002 is the offset or locater for the URI in the code. Column 1004 is the hexadecimal data describing the URI. Column 1006 shows the hexadecimal data interpreted into numbers and ASCI characters. Highlight 1008 is the leading bytes for the URI content block in hexadecimal data. The actual data content following the leading bytes is the URI "https://www.opswat.com." The hexadecimal data is directly interpreted in highlight 1010 in column 1006. For example, in column 1004, the first number in highlight 508 is "54" which is interpreted in column 1006 as the first symbol in highlight 1010 as "T". Correlating highlight 1008 to highlight 1010, a URI is described as "Type/Action/S/URI/URI(https://www.opswat.com/)".

At step 954, in some embodiments, the data is parsed from the actual content 914n in the content block 910n having the URI hyperlink and it is confirmed that the file 900 actually contains a URI hyperlink.

Figure 10B:
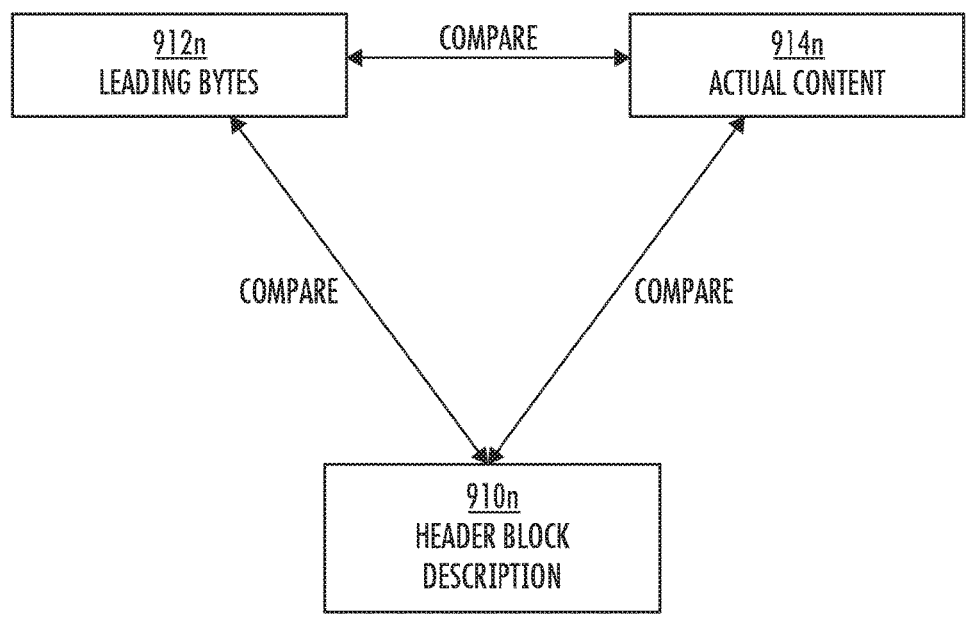
FIG. 10B is a simplified flowchart of comparing data from the header block description, data from the content block and data from the actual content, in accordance with some embodiments.

At step 956, the results from steps 950, 952 and 954 for the parsed data are compared. FIG. 10B is a simplified flowchart of comparing data from the header block description, data from the content block and data from the actual content, in accordance with some embodiments. The data from the header block description 908n is compared to the data from the leading bytes 912n. Data from the leading bytes 912n is compared to the data from the actual content 914n. Data from the header block description 908n is compared to the data from the actual content 914n. For example, the result of step 950 regarding the header block description 908n determined that a URI is present in the file 900. The result of step 952 regarding the leading bytes 912n also determined that a URI is present in the file 900. The result of step 954 regarding actual content 914n also determined that a URI is present in the file 900. Since these results are consistent with one another, meaning in each of the cases it was determined that there is a URI in the file, the method proceeds to step 958, or repeats steps 950-956 for each content block 910 and/or each object embedded therein. At step 958, the file format type 904 is validated, and at step 960, the file 900 is deemed trustable. At step 962, the validated file type is returned, such as by through the communication system 100 or by a notification being sent to the user (e.g. receiver). If however, at step 956, the three comparisons are not consistent with one another, the method proceeds to step 964 and the file 900 is determined to be not trustable.

Parsing data from three areas of the file (the header block descriptions 908a-n, the leading bytes 912a-n, and the actual content 914a-n), then comparing the results to one another, enables a high level of scrutiny and confidence that the file contains what is described in the file header 902. In this way, it can be determined that the file format type matches what is in the file and the file is free, or highly likely to be free, from malicious content.

In a non-limiting example, a file 900 is received which is an image file having the file suffix of .jpeg. Among many attributes, the file 900 is an image of a circle. The header 902 in the file 900 has a file format type 904 of .jpeg. The header is broken down into blocks and has a plurality of header blocks 906 (906a . . . 906n) and a plurality of header block descriptions 908 (908a . . . 908n). The file 900 has a plurality of content blocks 910 (910a . . . 910n) and each content block 910 has leading bytes 912 (912a . . . 912n) and actual content 914 (914a . . . 914n).

At step 950, data is parsed from the header block description 908b of header block 906b. In some embodiments, the parsed data is the image. The bytes are analyzed and interpreted to be an image with a width of 300 and a height of 300. In this way, the header block description 908b indicated an image and that image actually appears in the code. At step 952, data is parsed from the content block 910b having the image. The leading bytes 912b are read and an image is identified in the leading bytes 912*b*. The bytes following the leading bytes 912*b* in the content block 910*b* are analyzed and no information for an image is found. Instead, the bytes following the leading bytes 912*b* are for a macro. At step 954, in some embodiments, the data is parsed from the actual content 914*b* in the content block 910*b* having the image of the circle and it is confirmed that the file 900 actually contains an image of the circle.

At step 956, the results from steps 950, 952 and 954 for the parsed data are compared. This time, the data is not consistent with one another because step 950 and 954 resulted in an image while step 952 resulted in a macro. The method proceeds to step 964 and the file is deemed not trustable. The file format type 904 in the header 902 is not what is truly in the file 900. A not trustable file is suspicious for a potential threat. The file 900 may be further analyzed for potential threats. Since the comparison of step 956 failed for block content 910*b*, the method has a starting point or location of where to begin further analysis and look for the potential threat.

Figure 11:
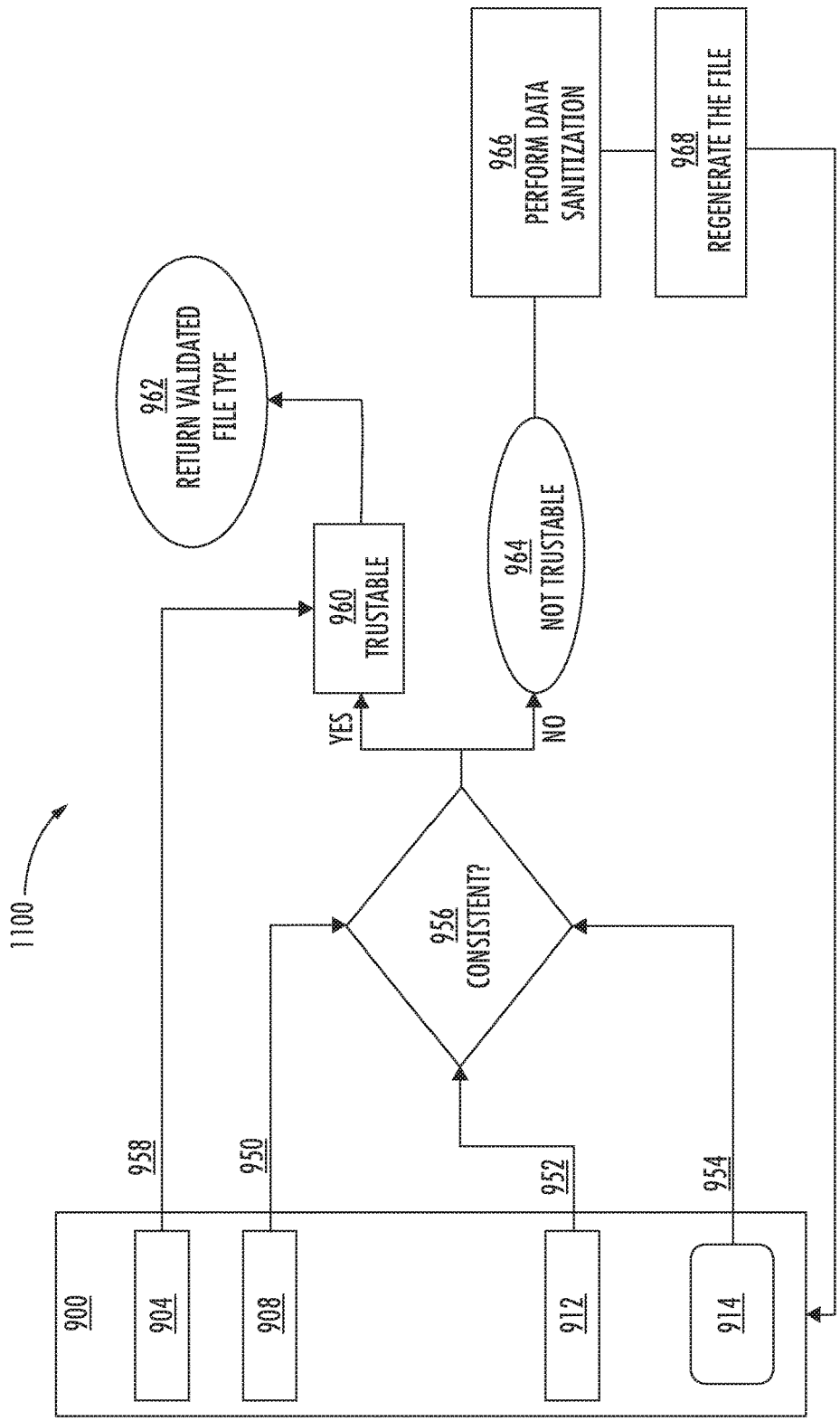
FIG. 11 is a simplified flowchart of an example method for file format validation and data sanitization, in accordance with some embodiments.

The method and system for file format validation validates a given file format type by matching the file format identifier information in a secure way. This may be used in conjunction with other security focused methods such as multi-scanning, vulnerability scanning, data sanitization including Content Disarm and Reconstruction (CDR), or policy compliance systems. It may provide additional security protection for communication data channels including email, portable media, web downloading and file sharing. For example, data sanitization methods such as CDR may be added for document base attack prevention. FIG. 11 is a simplified flowchart of a method 1100 for file format validation and data sanitization, in accordance with some embodiments.

Continuing from FIG. 9, if the file format is not trustable in step 964, then at step 966, data sanitization such as CDR may be performed by the computerized system 110. CDR is a computer security technology widely used in cyber security industries to prevent cyber security threats from entering a network. Generally, CDR removes malicious threats from files by removing file components. For example, when the data from the description, the data from the leading bytes and the data from the actual content are inconsistent with one another, sanitizing, by the computerized system 110, the file to remove malicious content. At step 968, after the malicious content is removed, the file is regenerated by the computerized system 110 and the regenerated file becomes the new, incoming file and the method 1100 begins again.

The method and system for file format validation is beneficial by providing a foundation for other security checks. Because the file format validation is dynamic and not relying on static databases, there is a higher degree of certainty that the file format type is truly as described in the file header. In this way, different levels of security checks may be implemented based on the particular file format type. For example, when the file is validated as a .txt, there is a low risk for malicious content, so a basic security check may be performed. In another embodiment, when the file is validated as a .exe file, a higher level security check may be necessary because that file type has a higher risk of malicious content. This allows security measures to be performed on the file based on the particular file format type instead of a blanket security policy, thus saving time and resources. In some embodiments when the file is not trustable because the file format type could not be validated, the method and system enable an efficient way to determine whether security checks, such as sanitization methods to remove the malicious content, should be performed.

Figure 12:
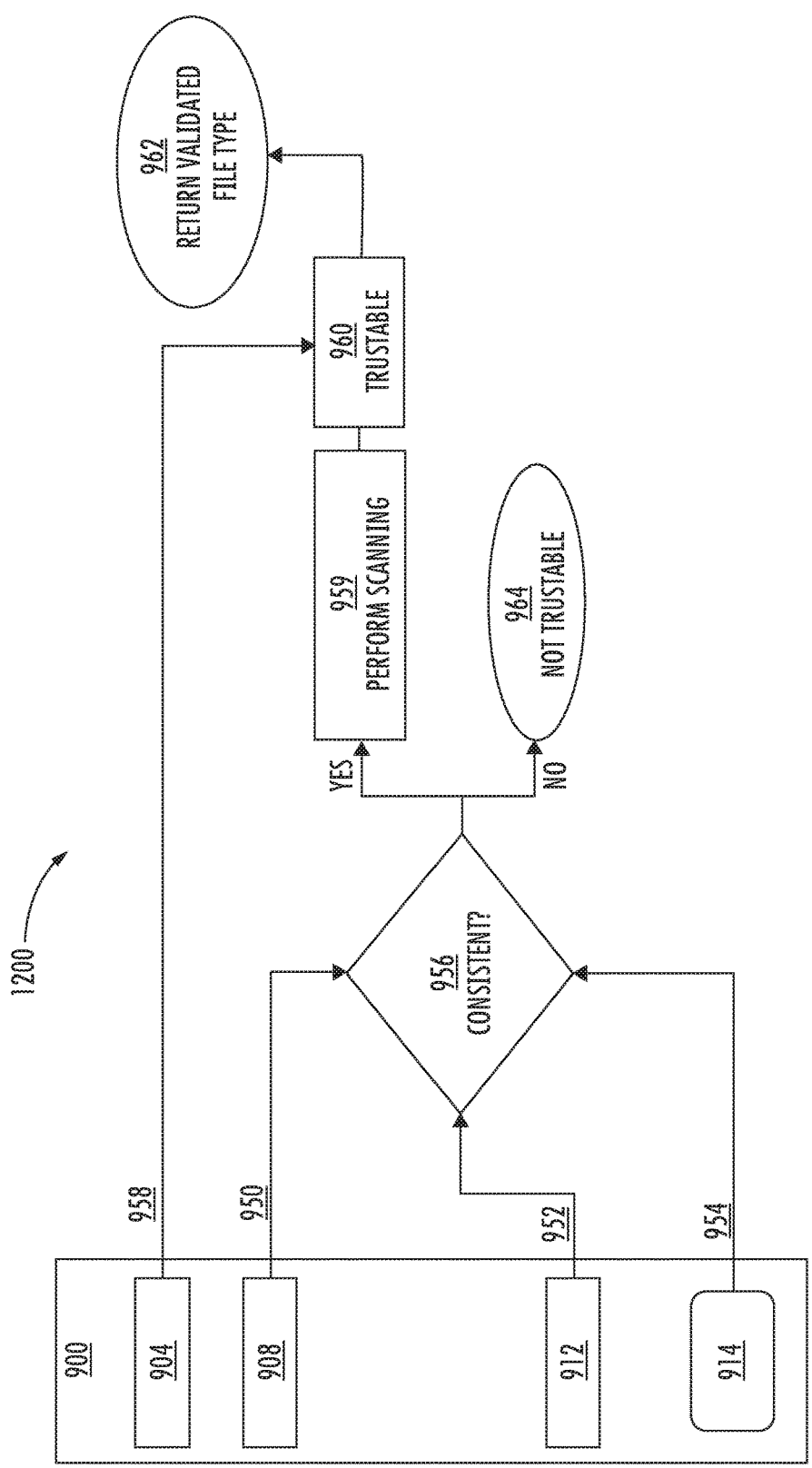
FIG. 12 is a simplified flowchart of an example method for file format validation, and malware and vulnerability prevention, in accordance with some embodiments.

The method and system may be used with multi-scanning or vulnerability scanning technology for malware and vulnerability prevention. FIG. 12 is a simplified flowchart of a method 1200 for file format validation, and malware and vulnerability prevention, in accordance with some embodiments. As described in FIG. 9, when the data is consistent at step 956, at step 959, multi-scanning or vulnerability scanning technology may be performed. If this is successful, then the method proceeds to step 960 and the file is deemed as trustable. Otherwise, the file is deemed untrustable or infected.

Figure 13:
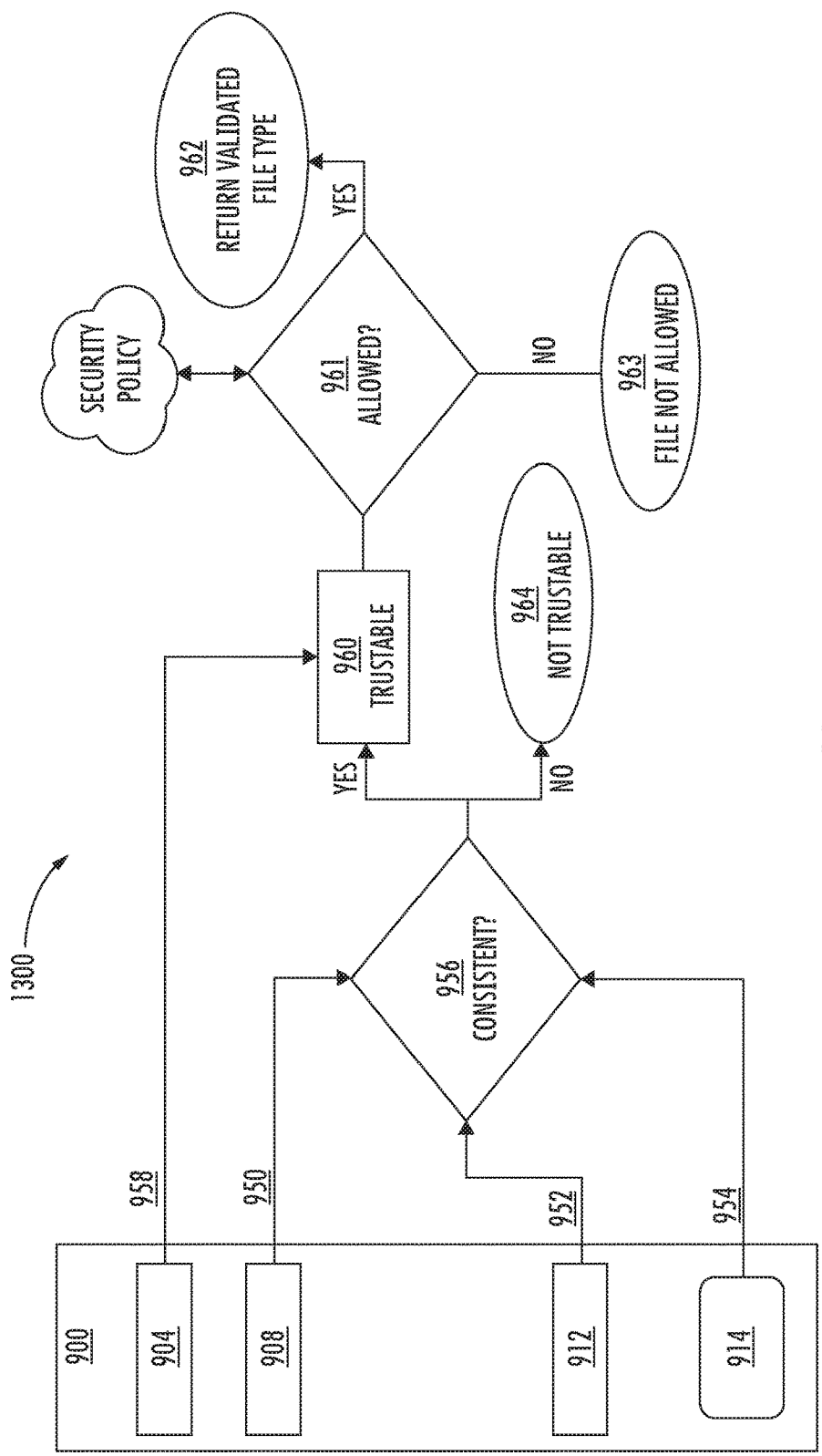
FIG. 13 is a simplified flowchart of an example method for file format validation and a security policy enforcement system for data compliance validation, in accordance with some embodiments.

The method and system may be used with a security policy enforcement system for data compliance validation. FIG. 13 is a simplified flowchart of a method 1300 for file format validation and a security policy enforcement system for data compliance validation, in accordance with some embodiments. As described in FIG. 9, at step 960, once the file format type is trustable, then at step 961, a security policy is accessed through the network to determine if the file is allowed. If so, then at step 962, the validated file type is returned. If not, then at step 963, the file is not allowed.

Figure 14:
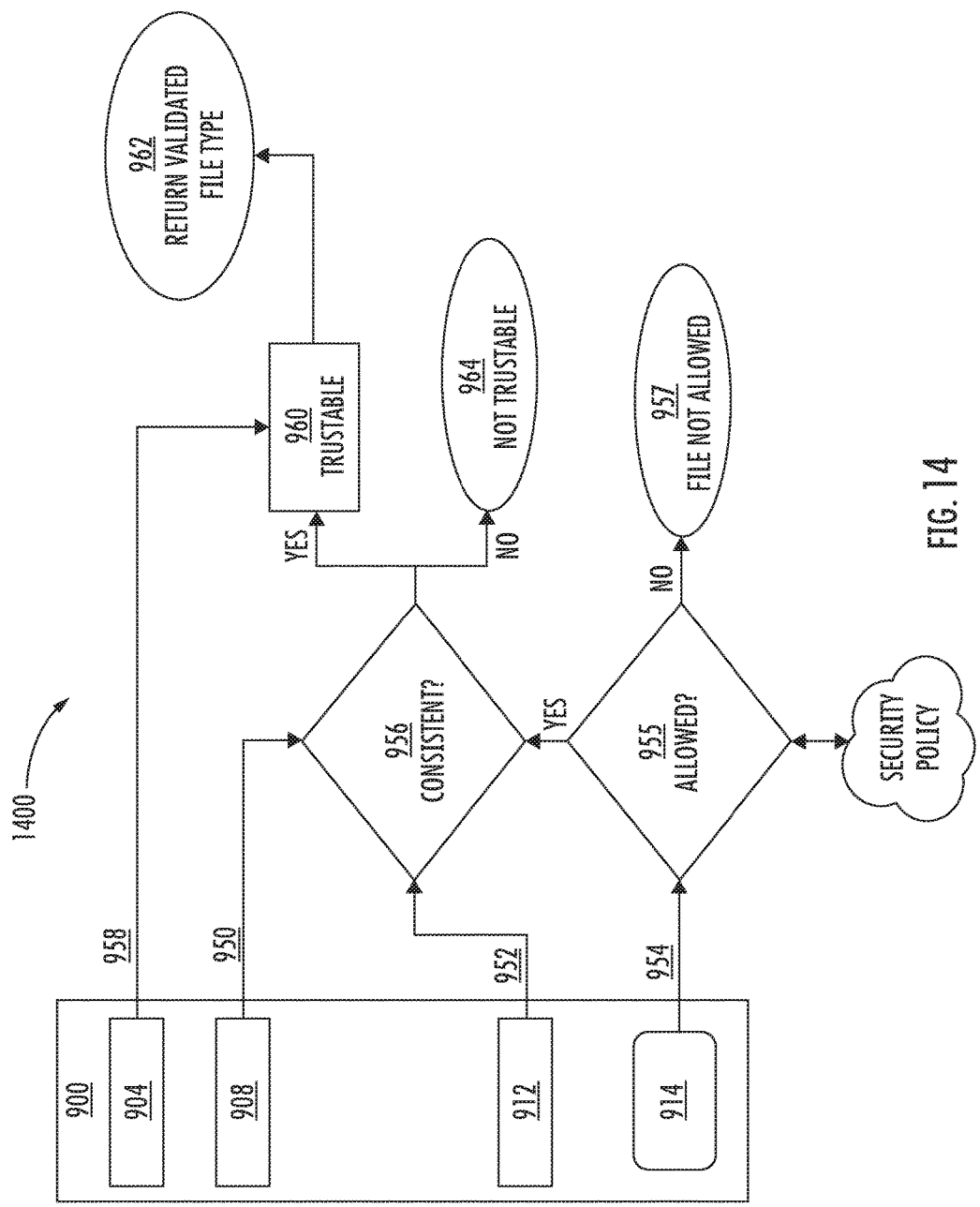
FIG. 14 is a simplified flowchart of an example method for file format validation and a security policy enforcement system for data compliance validation, in accordance with some embodiments.

FIG. 14 is a simplified flowchart of a method 1400 for file format validation and a security policy enforcement system for data compliance validation, in accordance with some embodiments. As described in FIG. 13, a security policy may be accessed through the network to determine if the file is allowed. In this embodiment, the security policy is assessed in step 955. If it is allowed, then the method 1400 proceeds to step 956 as described herein. If not, at step 957, the file is not allowed.

The embodiments described herein are directed to improvements to file format validation solutions. The present application discloses a method for file format validation which dynamically parses data from the file itself instead of relying on signature-based, static databases or libraries. This makes the method effective on an array of file formats. These databases are often created and maintained by a third-party so the integrity of the database is unknown and not controlled. By parsing the data in different ways and then comparing the results for consistency, the file format type identified in the header can be validated by confirming the actual content is indeed present in the file free from hidden threats possibly embedded in the code. When the parsed data is not consistent with one another, it may indicate potential malicious content in the file. In this case, because of the way the content of the file is organized, the location of the potential malicious content in the file can be immediately examined. The methods and systems ensure the integrity and safety of the file before entering a network by validating the file format type, confirming what should be in the file, and detecting potential threats from data in the file which should not be in the file. These aspects increase the integrity of the file and minimize the security risk of the file to the network or user devices.

Figure 15:
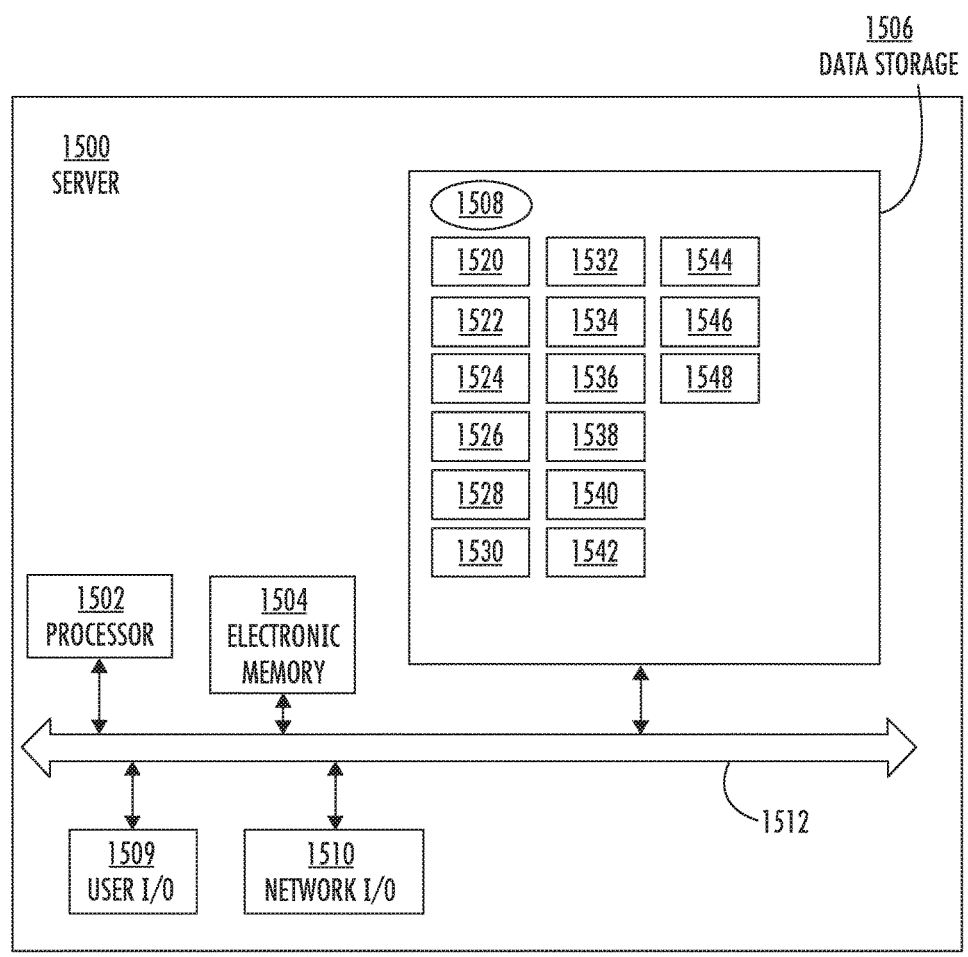
FIG. 15 is a simplified schematic of an example server for use in some embodiments.

FIG. 15 is a simplified schematic diagram showing an example server 1500 (representing any combination of one or more of the servers) for use in the communication system 100, in accordance with some embodiments. Other embodiments may use other components and combinations of components. For example, the server 1500 may represent one or more physical computer devices or servers, such as web servers, rack-mounted computers, network storage devices, desktop computers, laptop/notebook computers, etc., depending on the complexity of the communication system 100. In some embodiments implemented at least partially in a cloud network potentially with data synchronized across multiple geolocations, the server 1500 may be referred to as one or more cloud servers. In some embodiments, the functions of the server 1500 are enabled in a single computer device. In more complex implementations, some of the functions of the computing system are distributed across multiple computer devices, whether within a single server farm facility or multiple physical locations. In some embodiments, the server 1500 functions as a single virtual machine.

In some embodiments where the server 1500 represents multiple computer devices, some of the functions of the server 1500 are implemented in some of the computer devices, while other functions are implemented in other computer devices. For example, various portions of the enterprise system 106 can be implemented on the same computer device or separate computer devices. In the illustrated embodiment, the server 1500 generally includes at least one processor 1502, a main electronic memory 1504, a data storage 1506, a user I/O 1509, and a network I/O 1510, among other components not shown for simplicity, connected or coupled together by a data communication subsystem 1512.

The processor 1502 represents one or more central processing units on one or more PCBs (printed circuit boards) in one or more housings or enclosures. In some embodiments, the processor 1502 represents multiple microprocessor units in multiple computer devices at multiple physical locations interconnected by one or more data channels. When executing computer-executable instructions for performing the above described functions of the server 1500 in cooperation with the main electronic memory 1504, the processor 1502 becomes a special purpose computer for performing the functions of the instructions.

The main electronic memory 1504 represents one or more RAM modules on one or more PCBs in one or more housings or enclosures. In some embodiments, the main electronic memory 1504 represents multiple memory module units in multiple computer devices at multiple physical locations. In operation with the processor 1502, the main electronic memory 1504 stores the computer-executable instructions executed by, and data processed or generated by, the processor 1502 to perform the above described functions of the server 1500.

The data storage 1506 represents or comprises any appropriate number or combination of internal or external physical mass storage devices, such as hard drives, optical drives, network-attached storage (NAS) devices, flash drives, etc. In some embodiments, the data storage 1506 represents multiple mass storage devices in multiple computer devices at multiple physical locations. The data storage 1506 generally provides persistent storage (e.g., in a non-transitory computer-readable or machine-readable medium 1508) for the programs (e.g., computer-executable instructions) and data used in operation of the processor 1502 and the main electronic memory 1504.

In some embodiments, the programs and data in the data storage 1506 include, but are not limited to, a receiver 1520 for receiving an input file; an identifier 1522 for identifying components and attributes; a parsing routine 1524 for parsing data from the description of the header block, the leading bytes of the content block and the actual content; an analyzer 1526 for analyzing components and attributes; a comparer 1528 for comparing data to one another; a validation routine 1530 for validating the file format type; a sanitization routine 1532 to perform data sanitization such as CDR; a regenerator 1534 to regenerate files; a scanning routine 1536 to scan files; a data access routine 1538 to access security policies; an in-memory message bus 1540 for internal communication within the enterprise system 106; a reading routine 1542 for reading information from the data storage 1506 into the main electronic memory 1504; a storing routine 1544 for storing received files and information onto the data storage 1506; a network communication services program 1546 for sending and receiving network communication packets through the networks 104 and 108; a gateway services program 1548 for serving as a gateway to communicate information between servers and users; among other programs and data. Under control of these programs and using this data, the processor 1502, in cooperation with the main electronic memory 1504, performs the above described functions for the server 1500.

The user I/O 1509 represents one or more appropriate user interface devices, such as keyboards, pointing devices, displays, etc. In some embodiments, the user I/O 1509 represents multiple user interface devices for multiple computer devices at multiple physical locations. A system administrator, for example, may use these devices to access, setup and control the server 1500.

The network I/O 1510 represents any appropriate networking devices, such as network adapters, etc. for communicating through the communication system 100. In some embodiments, the network I/O 1510 represents multiple such networking devices for multiple computer devices at multiple physical locations for communicating through multiple data channels.

The data communication subsystem 1512 represents any appropriate communication hardware for connecting the other components in a single unit or in a distributed manner on one or more PCBs, within one or more housings or enclosures, within one or more rack assemblies, within one or more geographical locations, etc.

The computerized system 110 includes a memory 1504 storing executable instructions (loaded from the data storage 1506) and a processor 1502. The processor 1502 is coupled to the memory 1504 and performs the method, such as method 400, by executing the instructions stored in the memory 1504. The method includes the processor 1502 receiving a file having a file format type, a header having a header block with a description representing attributes of the actual content in the file, and a content block. The content block has leading bytes representing attributes of the actual content in the file and actual content in the file. The processor 1502 parses data from the description of the header block, the leading bytes of the content block and the actual content. The data from the description to the data from the leading bytes, ii) the data from the leading bytes to the data from the actual content, and iii) the data from the description to the data from the actual content. The processor 1502 compares the data from the description to the data from the leading bytes. The processor 1502 compares the data from the leading bytes to the data from the actual content. The processor 1502 compares the data from the description to the data from the actual content. The processor 1502 validates the file format type when the data from the description, the data from the leading bytes and the data from the actual content are consistent with one another.

The non-transitory computer readable medium 1508 includes instructions (i.e., the programs and data 1520-1548 described above) that, when executed by the processor 1502, cause the processor 1502 to perform operations including the method 400 as described herein.

One or more aspects or features of the subject matter described herein can be realized in digital electronic circuitry, integrated circuitry, specially designed application specific integrated circuits (ASICs), field programmable gate arrays (FPGAs), computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or an assembly/machine language. As used herein, the term "machine-readable medium" (i.e., non-transitory computer-readable media) refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a machine-readable medium. The machine-readable medium can store such machine instructions non-transitorily, such as for example as would a non-transient solid-state memory or a magnetic hard drive or any similar storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor, for displaying information to the user and a keyboard and a pointing device, such as for example a mouse, a touchpad or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one" or "one or more" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

While the specification has been described in detail with respect to specific embodiments of the present invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the scope of the present invention, which is more particularly set forth in the appended claims.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method for determining trustworthiness of a file by file format validation, the method comprising:
    receiving, by a computer, a file, the file having:
        a file format type;
        a header having a first header block with a first description representing attributes of a first portion of actual content in the file; and
        a first content block having i) first leading bytes representing the attributes of the first portion of the actual content in the file and ii) the first portion of the actual content in the file;
    parsing, by the computer, data from the first description of the first header block, the first leading bytes of the first content block and the first portion of the actual content;
    comparing, by the computer, i) the data from the first description to the data from the first leading bytes, ii) the data from the first leading bytes to the data from the first portion of the actual content, and iii) the data from the first description to the data from the first portion of the actual content; and based on the comparison, validating, by the computer, the file format type when the data from the first description, the data from the first leading bytes and the data from the first portion of the actual content are consistent with one another.

2. The method of claim 1, further comprising:

when the data from the description, the data from the leading bytes and the data from the actual content are inconsistent with one another, sanitizing, by the computer, the file to remove malicious content; and regenerating, by the computer, the file after the malicious content is removed.

3. The method of claim 1, wherein the description represents attributes of the actual content in the file, the attributes being at least one of an image, text, table, embedded object, hyperlink, assembly code, a macro, scripts, dimension, file extension, reference table symbol, function, author of the file, or audio track.

4. The method of claim 1, wherein the leading bytes represent attributes of the actual content in the file, the attributes being at least one of an image, text, table, dimension, embedded object, macro, hyperlink, function, assembly code, scripts pointer, encoding mechanism, decoding mechanism, author of the file, or audio track.

5. The method of claim 1, wherein the actual content includes at least one of an image, text, table, embedded object, hyperlink, assembly code, a macro, scripts, dimension, file extension, reference table symbol, function, author of the file, or audio track.

6. The method of claim 1, wherein header block bytes describe the attributes of the actual content in the file.

7. The method of claim 1, wherein:

the leading bytes are at the beginning of the content block;

content block bytes follow the leading bytes in the content block; and the content block bytes further define the attributes of the actual content in the file represented by the leading bytes.

8. The method of claim 1, further comprising:

when the data from the description, the data from the leading bytes and the data from the actual content are inconsistent with one another, identifying, by the computer, the header block, the content block or the actual content location of the inconsistent data; and rejecting, by the computer, the file when the data from the description, the data from the leading bytes and the data from the actual content are inconsistent with one another.

9. The method of claim 1, wherein the header of the file further has a second header block with a second description representing attributes of a second portion of the actual content in the file.

10. The method of claim 1, wherein the file further has a second content block having i) second leading bytes representing attributes of a second portion of the actual content in the file and ii) the second portion of actual content in the file.

11. A computerized system for determining trustworthiness of a file by file format validation, the system comprising:

a memory storing executable instructions; and a processor, coupled to the memory, that performs a method by executing the instructions stored in the memory, the method comprising:

receiving, by the processor, a file, the file having:

a file format type;

a header having a first header block with a first description representing attributes of a first portion of actual content in the file; and a first content block having i) first leading bytes representing the attributes of the first portion of the actual content in the file and ii) the first portion of the actual content in the file;

parsing, by the processor, data from the first description of the first header block, the first leading bytes of the first content block and the first portion of the actual content;

comparing, by the processor, i) the data from the first description to the data from the first leading bytes, ii) the data from the first leading bytes to the data from the first portion of the actual content, and iii) the data from the first description to the data from the first portion of the actual content; and based on the comparison, validating, by the processor, the file format type when the data from the first description, the data from the first leading bytes and the data from the first portion of the actual content are consistent with one another.

12. The system of claim 11, further comprising:

when the data from the description, the data from the leading bytes and the data from the actual content are inconsistent with one another, sanitizing, by the processor, the file to remove malicious content; and regenerating, by the processor, the file after the malicious content is removed.

13. The system of claim 10, wherein the description represents attributes of the actual content in the file, the attributes being at least one of an image, text, table, embedded object, hyperlink, assembly code, a macro, scripts, dimension, file extension, reference table symbol, function, author of the file, or audio track.

14. The system of claim 10, wherein the leading bytes represent attributes of the actual content in the file, the attributes being at least one of an image, text, table, dimension, embedded object, macro, hyperlink, function, assembly code, scripts pointer, encoding mechanism, decoding mechanism, author of the file, or audio track.

15. The system of claim 10, wherein the actual content includes at least one of an image, text, table, embedded object, hyperlink, assembly code, a macro, scripts, dimension, file extension, reference table symbol, function, author of the file, or audio track.

16. The system of claim 10, wherein header block bytes describe the attributes of the actual content in the file.

17. The system of claim 10, wherein:

the leading bytes are at the beginning of the content block;

content block bytes follow the leading bytes in the content block; and the content block bytes further define the attributes of the actual content in the file represented by the leading bytes.

18. The system of claim 10, further comprising:

when the data from the description, the data from the leading bytes and the data from the actual content are inconsistent with one another, identifying, by the processor, the header block, the content block or the actual content location of the inconsistent data; and rejecting, by the processor, the file when the data from the description, the data from the leading bytes and the data from the actual content are inconsistent with one another.

19. The system of claim 10, wherein the header of the file further has a second header block with a second description representing attributes of a second portion of the actual content in the file.

20. The system of claim 10, wherein the file further has a second content block having i) second leading bytes representing attributes of a second portion of the actual content in the file and ii) the second portion of actual content in the file.

* * * * *